(12) United States Patent
Iida

(10) Patent No.: US 6,900,882 B2
(45) Date of Patent: May 31, 2005

(54) PRINT PROCESSING METHOD, PRINTING ORDER RECEIVING MACHINE AND PRINT PROCESSING DEVICE

(75) Inventor: Takayuki Iida, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/000,368

(22) Filed: Dec. 4, 2001

(65) Prior Publication Data

US 2002/0089653 A1 Jul. 11, 2002

(30) Foreign Application Priority Data

Dec. 4, 2000 (JP) .................................. 2000-368374

(51) Int. Cl.$^7$ .......................... G03B 27/32; G03B 27/52
(52) U.S. Cl. ............................................. 355/77; 355/40
(58) Field of Search .............................. 355/40–41, 77, 355/27–29; 396/567–570

(56) References Cited

U.S. PATENT DOCUMENTS

| | | | | |
|---|---|---|---|---|
| 5,319,401 A | * | 6/1994 | Hicks | 354/76 |
| 5,359,387 A | * | 10/1994 | Hicks | 355/40 |
| 6,157,435 A | * | 12/2000 | Slater et al. | 355/40 |
| 6,226,071 B1 | * | 5/2001 | Ishii et al. | 355/40 |
| 6,429,923 B1 | * | 8/2002 | Ueda et al. | 355/40 |
| 6,483,570 B1 | * | 11/2002 | Slater et al. | 355/40 |
| 6,515,732 B1 | * | 2/2003 | Fant et al. | 355/40 |
| 6,674,923 B1 | * | 1/2004 | Shih et al. | 382/305 |
| 6,744,529 B2 | * | 6/2004 | Winter et al. | 358/1.15 |

* cited by examiner

*Primary Examiner*—Henry Hung Nguyen
(74) *Attorney, Agent, or Firm*—Birch, Stewart, Kolasch & Birch, LLP

(57) ABSTRACT

A method and a device are provided for automating receipt of orders for additional printing of a photographic print, including order information relating to desired image processing. In a print order receiving machine, when a photographic print is inserted, an image of the photographic print is read and displayed on a monitor (steps 150, 152). When order conditions are inputted, an image which is processed on the basis of the order conditions is displayed on the monitor (steps 154 through 158). Further, when input of the order conditions is completed, the order conditions and order information based on the order conditions are set. The set order information is printed onto a photographic print as an invisible two-dimensional bar code. Copying processing of the photographic print is carried out on the basis of the order information which is read from the photographic print.

16 Claims, 24 Drawing Sheets

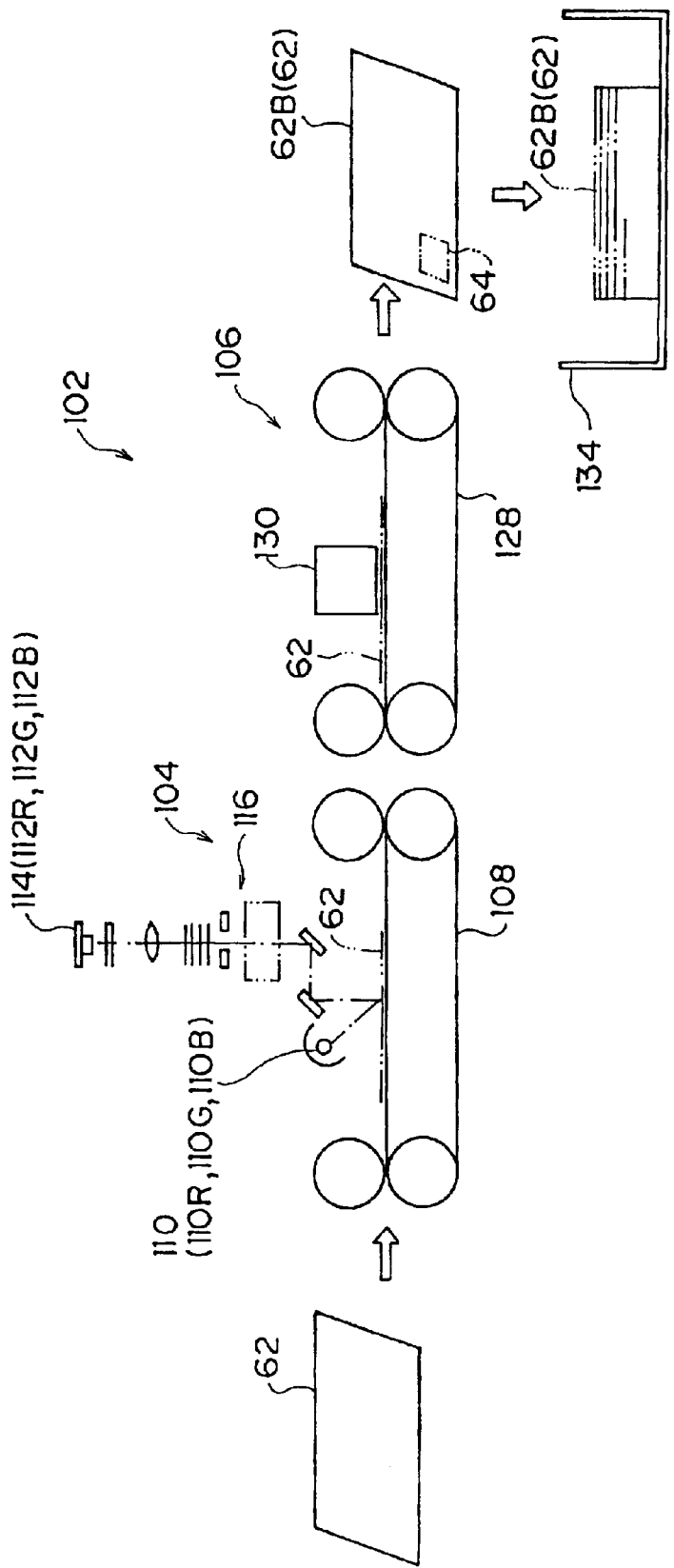

64

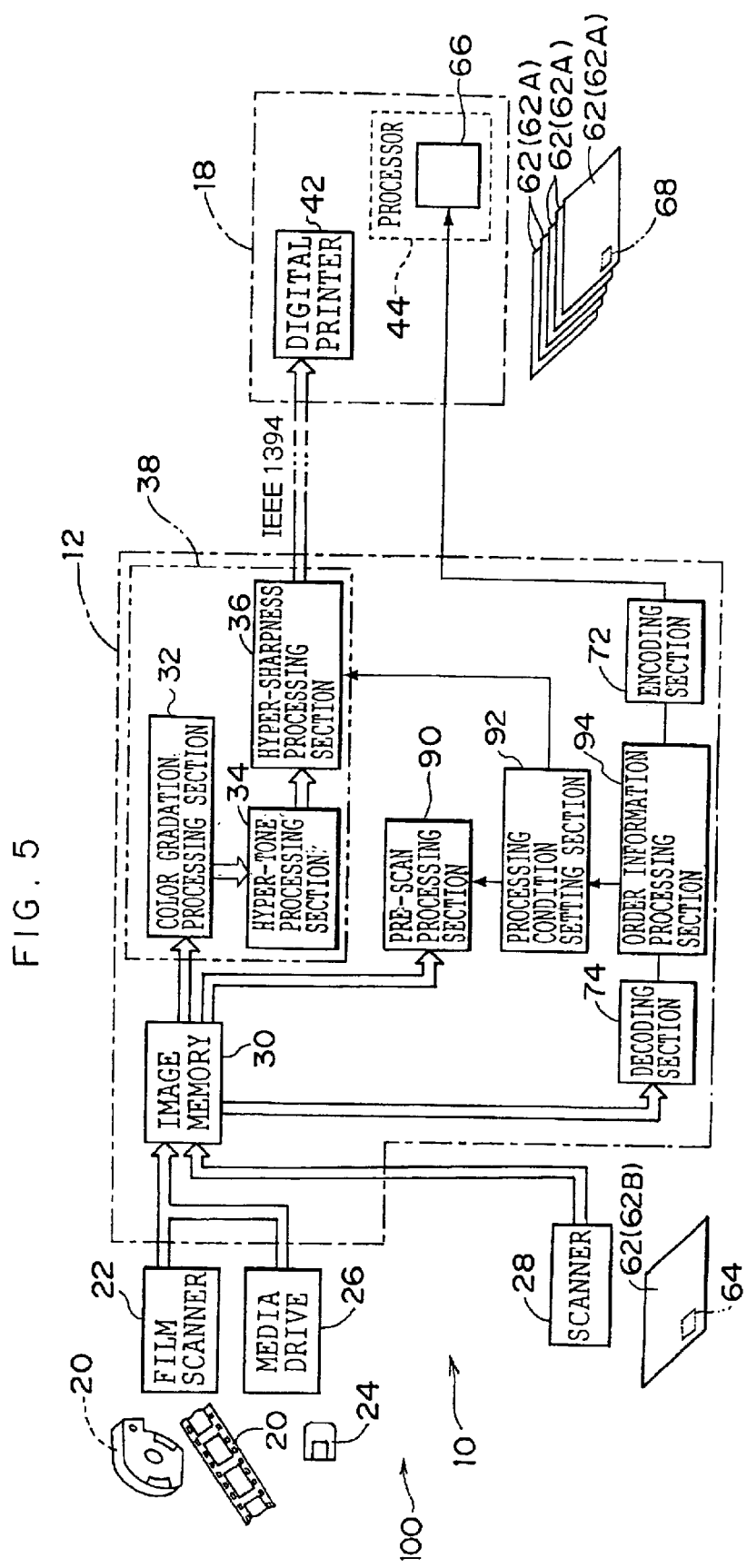

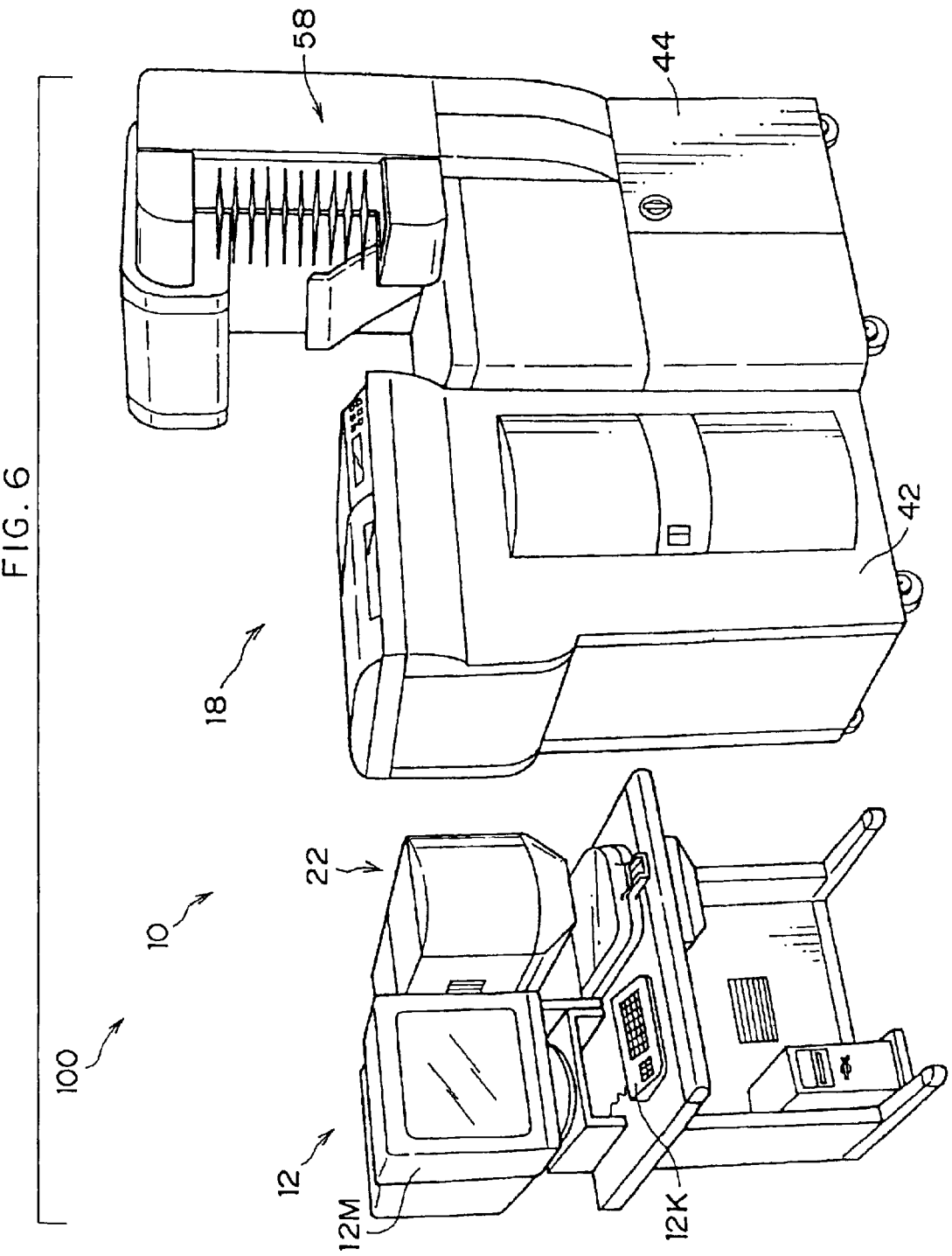

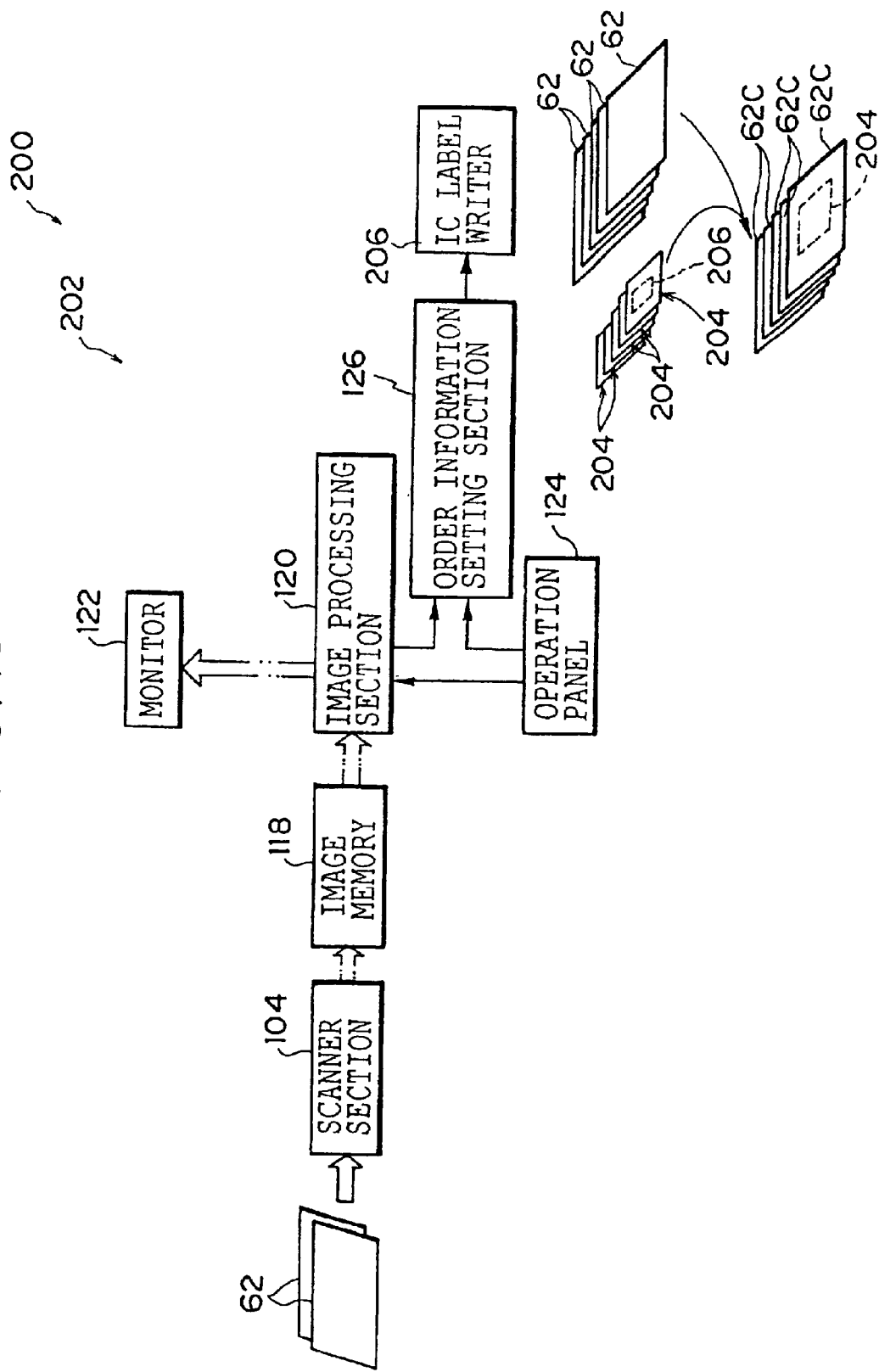

PRINT PROCESSING METHOD, PRINTING ORDER RECEIVING MACHINE AND PRINT PROCESSING DEVICE

BACKGROUND OF THE INVENTION

1. Field of the Invention

The present invention relates to a print processing method, a printing order receiving machine, and a print processing device for forming an image which is formed on an image recording medium such as a photographic printing paper or the like, on a new image recording medium, as is done, for example, when another photographic print is obtained from one photographic print.

2. Description of the Related Art

At DPE shops and laboratories and the like, when a photographic film which has been used for photography is brought-in, processing is carried out on the photographic film. At this time, if the preparation of additional prints at the time of development or index prints are requested, photographic prints or index prints are prepared by exposing photographic printing paper according to the images which are recorded on the photographic film. The photographic prints and the index print are returned to the customer together with the photographic film for which developing processing has been completed.

With the diversification of image processings in recent years, print systems have become popular in which after various image processings are carried out on image data (digital image data) which is prepared by reading an image recorded on a photographic film by a scanner or the like, a photographic print is prepared by using this image data. By using such a photographic print system, an index print, in which images which are recorded on a photographic film are disposed in a matrix-like arrangement, can also be prepared.

Further, with the popularization of digital still cameras (DSLs) or the like, at DPE shops or the like, there are cases when DTP service, in which photographic prints are prepared from image data or the like of images which have been photographed by a digital still camera, is requested. By using the above-described photographic print system, DTP service is possible.

On the other hand, usually, photograph prints are arranged and stored in an album or the like, and the photographic film is stored separately from the album and the photographic prints. Further, ordering of additional prints is carried out by viewing the photographic prints which are arranged in the album or the like.

Thus, at the time of ordering additional prints, there are cases in which the photographic prints are brought into the DPE shop or the like, rather than the photographic film or the order sheet (which is usually handed over at the time of requesting additional printing with development). In such a case, photographic prints can be prepared by reading the images of the photographic prints by a scanner, preparing image data, and exposing photographic printing paper or the like on the basis of this image data.

In order to make the ordering of additional prints more convenient, the idea of print services has been studied in which a printing order receiving machine, which is exclusively used for receiving orders for printing of additional prints or the like, is set separately from a laboratory or a DPE shop. A person who brings in photographic prints to order additional prints inputs various types of order information by himself or herself.

A print service such as this is possible if necessary items and order conditions are written-in on an order sheet.

However, in a case in which the order conditions are to be recorded on the order sheet, it is difficult to place the order such that the print will have a desired finish by, for example, changing the tint at the time of printing the image. Further, in cases in which staff are provided at places at which orders for printing of additional prints are received, the locations and order receiving times are limited.

SUMMARY OF THE INVENTION

The present invention is developed in light of the above-described circumstances, and an object of the present invention is to provide a print processing method which enables smooth ordering of a copy of an image with a desired finish by so-called self-service when the customer brings in an image recording medium on which a visible image is recorded such as a photographic print. In this print processing method the receiving of orders for additional printing is made more labor-efficient and the convenience at the time of requesting additional printing is improved. Moreover, an object of the present invention is to provide a print order receiving machine and a print processing device which are suited to this print processing method.

According to a first aspect of the present invention, there is provided a print processing method for carrying out print processing in which an image which corresponds to a visible image recorded on an image recording medium is formed onto a new image recording medium, the method comprising the steps of: reading and displaying the image which is formed on the image recording medium; changing the displayed image by carrying out image processing on the basis of processing conditions which are set in accordance with inputted order conditions; recording order information, which includes the processing conditions and the inputted order conditions onto one of the image recording medium on which the visible image is formed and an order information recording medium; and forming the image which is formed on the image recording medium onto the new image recording medium on the basis of the order information.

According to the first aspect, the image which is read by the image reading means is displayed on the display means. By inputting the order conditions by the inputting means while viewing the image which is displayed on the display means, image processing can be carried out and the image can be displayed on the basis of the processing conditions set in accordance with the order conditions.

By using the order conditions and the processing conditions of the image, an image corresponding to the order conditions can be formed on a new image recording medium.

Accordingly, by inputting the order conditions while viewing the image which is displayed on the display means, an image whose finish is according to one's liking can be formed on a new image recording medium.

Further, according to a second aspect of the present invention, there is provided a print processing method for carrying out print processing in which an image which corresponds to a visible image recorded on an image recording medium is formed, onto a new image recording medium, the method comprising the step of: recording inputted order conditions and processing conditions as order information onto the image recording medium on which the visible image is formed, and forming the image which is formed on the image recording medium onto a new image recording medium on the basis of the order information.

According to the second aspect, when the order conditions and the processing conditions of the image are inputted, the order conditions and the image processing conditions are recorded as is on the image recording medium as order information, and the order for additional printing is received. Accordingly, the person who places the order for the additional printing, inputs the order conditions and the image processing conditions. Thus, there is no need for staff to receive the order for additional printing, and the process can be made more labor-efficient. Further, orders for additional printing can always be made by self-service, and the convenience of placing an order for additional printing can be improved.

According to a third aspect of the present invention, there is provided a print order receiving machine which receives a print order to record an image which corresponds to a visible image formed on an image recording medium onto a new image recording medium, said print order receiving machine comprising: image reading means for reading the visible image formed on the image recording medium; display means for displaying an image which corresponds to image data which is read by the image reading means; order condition inputting means for inputting order conditions for forming an image which corresponds to the image formed on the image recording medium onto the new image recording medium; image processing means for carrying out a predetermined image processing on the image data which is read by the image reading means on the basis of processing conditions which are set in accordance with the order conditions which are inputted by the order condition inputting means, and for changing a display image of the display means in accordance with image data which has been subjected to image processing; and recording means for recording, onto an order information recording medium, order information which includes the order conditions which are inputted by the order condition inputting means and the processing conditions which are set by the image processing means.

According to the third aspect, the image formed on the image recording medium is read by the image reading means and is displayed on the display means. The image processing means carries out image processing on the basis of the processing conditions which are set in accordance with the order conditions which are inputted from the inputting means, and displays the processed image on the display means. Further, the order information recording means records, on the order information recording medium and as order information, the order conditions which are inputted from the inputting means and the processing conditions which are set by the image processing means.

Accordingly, the order information can be set such that the image formed on the new image recording medium has a desired finish. In a case in which the object is at least convenience of ordering additional prints and making order receiving more labor-efficient, the print order receiving machine may at least be equipped with an inputting means for inputting order information such as order conditions and processing conditions and the like, and a recording means for recording the inputted order information on the image recording medium.

On the other hand, according to a fourth aspect of the present invention, there is provided a print processing device which forms an image which corresponds to an image formed on an image recording medium onto a new image recording medium, the device comprising: image reading means for reading, as image data, the image formed on the image recording medium; order information reading means for reading order information which includes order conditions recorded on an order information recording medium and processing conditions; and image copying means for image-processing the image data which is read by the image reading means on the basis of the order information which is read by the order information reading means, and for forming an image onto the new image recording medium.

According to the fourth aspect, the image data which is read by the image reading means is subjected to image processing on the basis of the processing conditions in the order information which is read by the order information reading means. On the basis of the order conditions, the image data which has been subjected to image processing is formed on a new image recording medium.

Accordingly, by using an image recording medium on which an image is formed and an order information recording medium on which order information is recorded, the finish of the image formed on the new image recording medium can be made to match the tastes of the person who placed the order.

In the present invention, an image recording medium on which an image is formed can be used as the order information recording medium. At this time, for example, the order information may be formed as a visible image on the back of the print or the like, or may be formed as an invisible image. Further, the order information may be made into a bar code and recorded.

Accordingly, it is possible to only transfer the image recording medium on which the image is formed from the print order receiving machine to the print processing device, and the smoothness and reliability of processing can be improved. A one-dimensional bar code may be used as the bar code, but it is preferable to use a two-dimensional bar code whose information density is high.

By recording the order information as an invisible image, the order information can be recorded on the image surface of the image recording medium. Accordingly, the image reading means can also serve as the order information reading means.

Further, the print processing device of the present invention may include a copy information recording means for recording, on the image recording medium on which the new image is formed, copy information for the time of forming the image onto the new image recording medium on the basis of the order information.

In the same way as the order information, the copy information may be recorded as an invisible image, or may be made into a bar code and recorded.

The copy information recording means may record the copy information in a semiconductor memory which is carried on the image recording medium on which the new image is formed.

The semiconductor memory may be a structure which is formed to be about 0.2 mm to 0.4 mm thin, such as an IC label. By adhering such an IC label onto the image recording medium or the like, various types of information can be easily recorded onto the new information recording medium, without the handling ability of the new image recording medium deteriorating. This is preferable in making the image recording medium bear image information including the order information.

In the present invention, a photographic photosensitive material, such as a photographic printing paper or the like, may be used as the image recording medium. Image copying onto a photographic print from a photographic print in which an image is recorded on a photographic printing paper, and image copying from another image recording medium onto a photographic printing paper, can be carried out easily.

On the other hand, surface types of the finish of a photographic print are, for example, glossy, raster, silk, and the like, and the surface state differs in accordance with the surface type. Further, the surface type of the photographic print is revealed in the image data at the time of reading the image. Thus, it is preferable that the print order receiving machine of the present invention be equipped with a determining means for determining the state of the surface of the image recording medium on which the image is formed, and for the image processing and the setting of the order information to be carried out on the basis of the results of the determination. In this case, it is preferable that the print processing device includes a setting means for setting the surface state of the image recording medium from the order information which is recorded on the order information recording medium, and for image reading and image copying to be carried out on the basis of the setting of the setting means.

Accordingly, an image which is formed on an image recording medium can be read appropriately, and can be formed onto a new image recording medium. The determining means which is provided at the print order receiving machine may carry out a determination based on input by, for example, key operation of the person placing the order. Alternatively, the reading means may also be equipped with a function for detecting the surface state.

Namely, according to a fourth aspect of the present invention, there is provided a print order receiving machine that enables to read an image appropriately, and may comprise at least order condition inputting means for inputting order conditions for forming an image which corresponds to the visible image formed on the image recording medium onto the new image recording medium, image reading means for reading the visible image formed on the image recording medium, determining means for determining the surface conditions of the image recording medium, image processing means for reading the visible image formed on the image recording medium by the image reading means according to the determination results of the determining means, and for conducting a predetermined image processing onto the read image data, and recording means for recording, onto an order information recording medium, order information based on the image processing conditions at the image processing by the image processing means and the order conditions input from the order condition input means.

Judging means in this aspect may be one wherein the determining means includes a detecting means for detecting surface roughness of the image recording medium, and determines the surface conditions of the image recording medium on the basis of the detection results of the detecting means, and switches processing conditions for image processing by the image processing means on the basis of the determination results of the determining means.

While, as detecting means to be employed in such determining means, a detector wherein a spot light of a predetermined diameter is radiated onto an image recording medium, and reflected light of the spot light is received may be employed, and from the diffusion conditions of the reflected light received at this moment, it is possible easily and precisely determine the surface conditions of image recording medium where visible image is formed.

Further, it is preferable that when the image reading means reads an image by receiving reflected light of light radiated from a light source onto the image recording medium, the incidental angle of the light of the light source onto the image recording medium is switched according to the determination results of the determining means.

In such a print order receiving machine of the present invention, it is preferable that the image processing that the image processing means includes discoloration correction, thereby it is possible to reproduce the initial image that formed visible image on the image recording medium onto a new image recording medium.

In a print processing device, prior to reading an image, order information recorded in an order information recording medium may be read, and the surface conditions of an image recording medium may be set, and when reading an image, processing according to surface conditions such as a filter processing on the basis of this setting result may be carried out.

Further, determining means arranged to a print order receiving machine may be arranged to a print processing device, thereby it is possible to form an image according to a visible image formed on an image recording medium to a new image recording medium appropriately, without detecting surface conditions of the image recording medium wherein the visible image is formed.

BRIEF DESCRIPTION OF THE DRAWINGS

FIG. 3 is a schematic view showing a conveying path of a photographic print in the print order receiving machine according to the first embodiment of the present invention.

FIG. 5 is a schematic structural view of a print processing device according to the first embodiment of the present invention.

FIG. 6 is an exterior view showing an example of the print processing device.

FIG. 16 is a schematic structural view of a print order receiving machine according to a second embodiment of the present invention.

DESCRIPTION OF THE PREFERRED EMBODIMENTS

Hereinafter, embodiments of the present invention will be described.

[First Embodiment]

Figure 1:
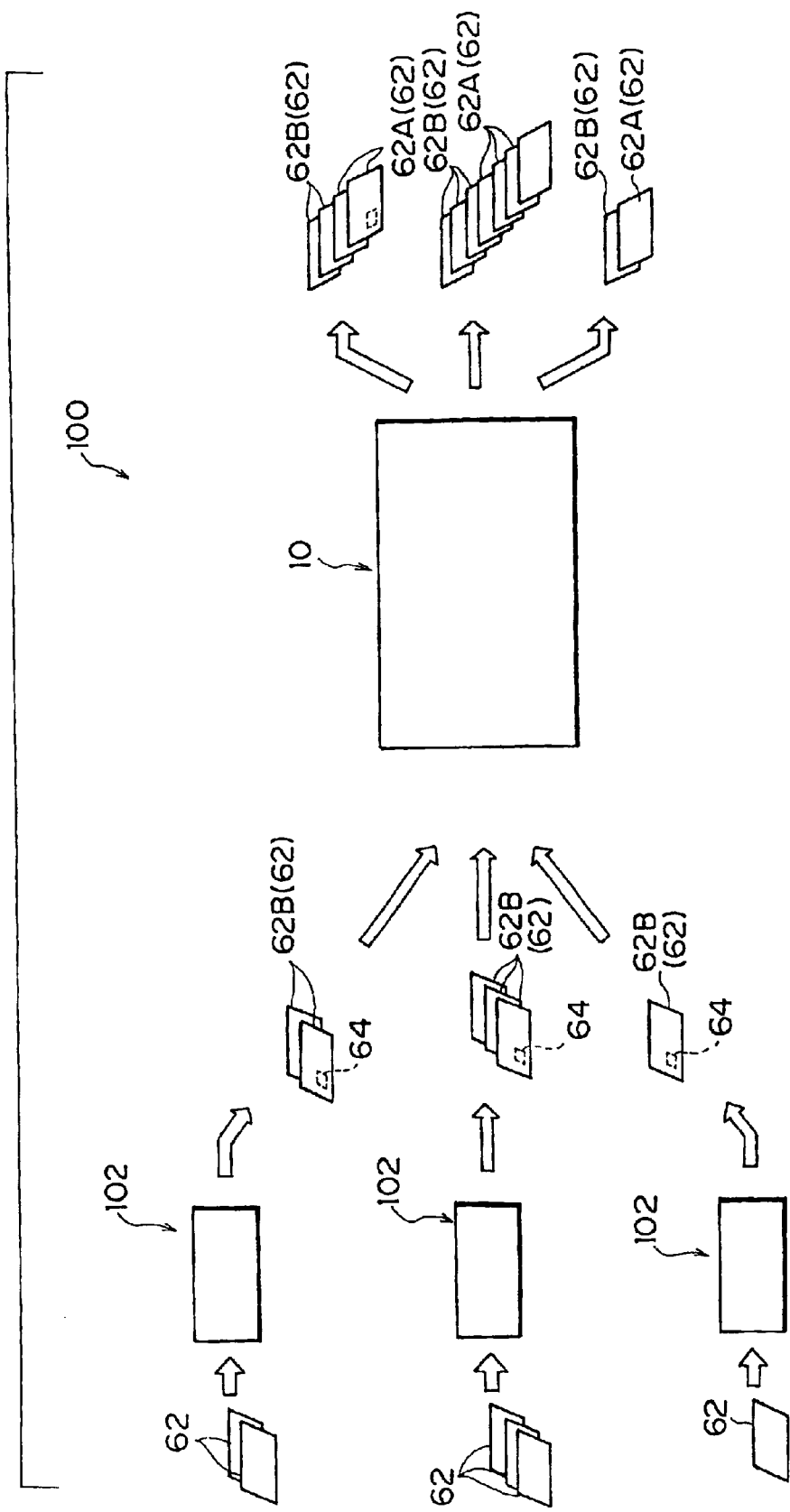
FIG. 1 is a schematic structural view of a print service system which is applied to a first embodiment of the present invention.

A schematic structure of a print service system 100 according to the embodiments of the present invention is shown in FIG. 1. The print service system 100 is structured by a plurality of print order receiving machines 102 and a print processing device 10.

Photographic prints 62, on which images are formed on photographic printing papers for example, are brought to the print order receiving machine 102 as an image recording media on which images are recorded. The print order receiving machine 102 receives copies of the images which are formed on the photographic prints 62 (additional printing receiving). At this time, at the print order receiving machine 102, various order conditions are inputted at the same time.

Further, the print processing device 10 prints images, which correspond to the images which are formed on the photographic prints 62, onto photographic printing papers 50 (refer to FIG. 7) in accordance with the additional printing order which is received at the print order receiving machine 102, so as to prepare new photographic prints 62 (hereinafter, "photographic prints 62A"). At this time, print processing, which is based on the order conditions which are inputted at the print receiving machine 102, is carried out at the print processing device 10.

The print order receiving machine 102 which is used for such a print service is set at a place which is different from that of the print processing device 10.

Figure 2:
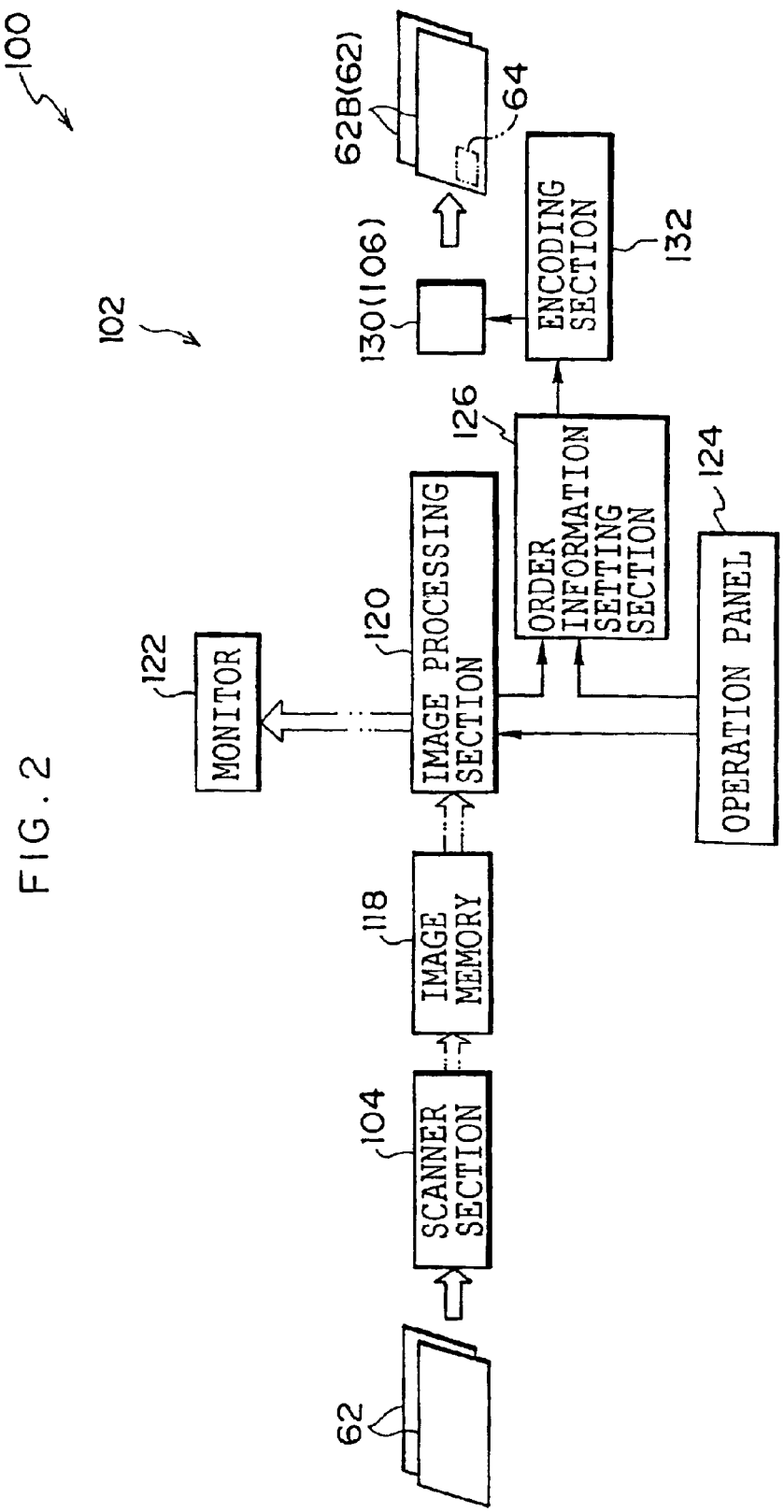
FIG. 2 is a schematic structural view of a print order receiving machine according to the first embodiment of the present invention.

The schematic structure of the print order receiving machine 102 is shown in FIG. 2 and FIG. 3. As shown in FIG. 3, a scanner section 104 and a printing section 106 are provided at the print order receiving machine 102. The photographic print 62 which is to be additionally printed is inserted into the scanner section 104 from an unillustrated insertion opening which is provided at the print order receiving machine 102. The scanner section 104 conveys the photographic print 62 at a constant speed by a conveying means such as a conveying belt 108 or the like.

Light sources 110 (110R, 110G, 110B), which emit lights of the respective colors of R, G, B toward the photographic print 62 which is a document image, and a CCD line sensor 114, which is formed by CCD arrays 112R, 112G, 112B which detect the lights of the respective colors of R, G, B which are reflected at the photographic print 62, are provided at the scanner section 104. Further, an optical system 116, which is structured by a plurality of reflection mirrors, various types of lenses and filters, and the like, is provided at the scanner section 104. The light which is irradiated from the light sources 110 is reflected at the photographic print 62 which is being conveyed at a constant speed on the conveying belt 108, and the image is focused on the CCD line sensor 114. Accordingly, the image which is formed on the photographic print 62 is read by the CCD line sensor 114.

As shown in FIG. 2, an image memory 118 is provided at the print order receiving machine 102. The output of the CCD line sensor 114 is A/D converted, and is stored as image data (digital image data) in the image memory 118. The scanner section 104 may carry out image reading at a resolution which can be displayed on a monitor which will be described later.

On the other hand, an image processing section 120, a monitor 122, and an operation panel 124 are provided at the print order receiving machine 102. The image which corresponds to the image data which is stored in the image memory 118, namely, the image which is formed on the photographic print 62, is displayed on the monitor 122.

Further, at the print order receiving machine 102, order conditions for the additional prints of the image which is formed on the photographic print 62 are inputted by key operation of the operation panel 124.

Examples of order conditions which are inputted are the name of the person who ordered the additional prints, information relating to the person who places the order such as the delivery destination (sending destination) of finished prints, the print size, and the number of prints, as well as instructions for special processings for forming images of a desired layout and image quality such as, for example, a superimposition of a plurality of images, affine conversion parameters at the time of rotating/moving the image, parameters in the case of converting the tone or color of the image, whether or not a template or clip art is desired, the selection of the template or the clip art which is used, information to be printed on the back surface of the print, and the like.

Further, a mechanism, which displays a variety of order items on a touch panel type monitor and by which the order conditions are selected and set from the respective items by a touch operation or the like, may be used as the operation panel 124. Alternatively, a mechanism in which order conditions are inputted by key operation of a keyboard or the like may be used as the operation panel 124.

The image processing section 120 displays the image, which corresponds to the image data which is stored in the image memory 118, on the monitor 122, and sets various parameters on the basis of the order conditions which are inputted by key operation of the operation panel 124. The image processing section 120 carries out, on the basis of the set parameters, processings which are conventionally known such as, for example, gray balance adjustment, gradation adjustment, density adjustment, saturation adjustment, sharpness (sharpening) processing, dodging processing, electronic magnification changing processing, geometric processing, peripheral quantity of light correcting processing, soft focusing processing, red-eye correcting processing, and the like.

Due to the image processings being carried out on the basis of the order conditions, an image which corresponds to the order conditions which are inputted by key operation of the operation panel 124 is displayed on the monitor 122, and the person placing the order can confirm the order contents while viewing the display of the monitor 122.

The image processing section 120 sets the processing conditions for the additional printing of the image of the photographic print 62, on the basis of the various parameters at the time of carrying out the image processings. The processing conditions which are set at the image processing section 120 are, together with the order conditions which are inputted by the key operation of the operation panel 124, inputted to an order information setting section 126. The order information for the additional printing of the photographic print 62 is set at the order information setting section 126 on the basis of the order conditions and the processing conditions and the like.

On the other hand, as shown in FIG. 3, the photographic print 62 which passed through the scanner section 104 is sent to a printing section 106 which is provided at the print order receiving machine 102. The photographic print 62 is conveyed by a conveying means such as a conveying belt 128 or the like at the printing section 106. A label writer 130 is provided at the printing section 62 so as to face the conveying path of the photographic print 62.

As shown in FIG. 2, an encoding section 132 is provided at the print order receiving machine 102. The encoding section 132 encodes the order information which is set at the order information setting section 126, and outputs the encoded order information to the label writer 130. The label writer 130 prints a label 64 which shows the encoded order information on the photographic print 62.

At the print service system 100 which is applied to the first embodiment, a two-dimensional bar code is used as the label 64 which is printed on the photographic print 62 at the print order receiving machine 102.

Generally, a bar code expresses a variety of information by a combination of parallel white and black lines. However, a bar code expresses information one-dimensionally, and the information amount is small, and the density of information is low.

In recent years, in order to express a large number of items of information at a high density, various ways of making bar codes two-dimensional (making two-dimensional bar codes) have been studied. In the first embodiment, a two-dimensional bar code is used as an example of the label 64.

Figure 4A:
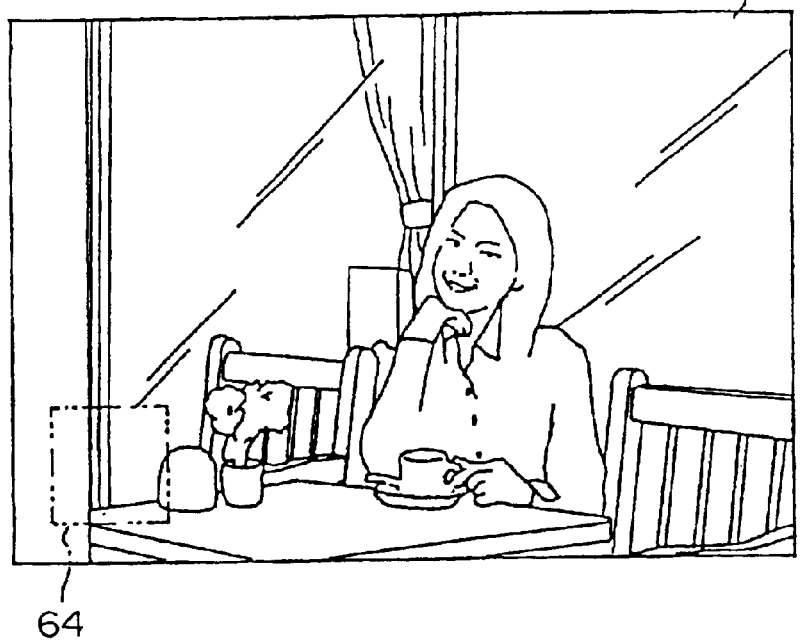
FIG. 4A is a schematic view of a photographic print which is received at the print order receiving machine according to the first embodiment of the present invention.
Figure 4B:
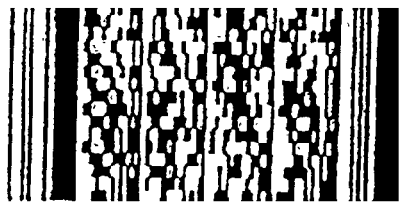
FIG. 4B and FIG. 4C are respectively a schematic view showing an example of a two-dimensional bar code which is printed as a label onto a photographic print.
Figure 4C:
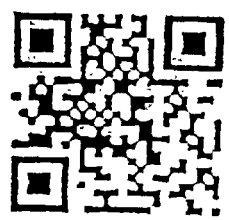

Types of two-dimensional bar codes include a stacked-type symbol, in which one-dimensional bar codes are stacked as shown in FIG. 4B, and a matrix-type symbol in which black and white are arranged in a gridiron layout as shown in FIG. 4C. Examples of the stacked-type symbol include Code49, Code16K, Codablock, PDF47, SuperCode, UltraCode, and the like. Examples of the matrix-type symbol include VeriCode, CPCode, DataMatrix, Code 1, MaxiCode, ArrayTag, AztecCode, DataMatrix EC200, QRCode Model 2, and the like. Any of these may be applied, or an exclusive-use symbol which is set separately from these symbols may be used.

These two-dimensional bar codes, and even the stacked-type symbols Code49 and Code16K which have the smallest amount of information, can display 49 characters or 77 characters in English characters, which is an amount of information which is several times that of a conventionally used one-dimensional bar code. Further, with matrix-type symbols, display of an amount of information of about 1520 English characters (1045 bytes) to 4296 characters (1847 bytes) is possible. Accordingly, binary data or characters which express various types of order information can be encoded and displayed.

Further, a two-dimensional bar code can be made to also have an error correcting function. Precise reading of the information can thereby be made possible.

A conventional one-dimensional bar code can be scanned one-dimensionally or can be read by a scanner using a CCD line sensor. In contrast, such a two-dimensional bar code is scanned by a CCD line sensor, or the symbol is read as image data by an area CCD sensor.

On the other hand, as shown in FIG. 4A, at the print order receiving device 102, the label 64 is printed onto the image surface of the photographic print 62 so as to be superposed on the image. At this time, the label writer 130 prints by using a ribbon or an ink which reflects only light of a wavelength in an invisible light region which is set in advance, such as infrared light or the like.

When visible light is irradiated onto such an ink or ribbon, no reflection or light emission occurs. When invisible light of a specific wavelength is irradiated onto the ink or ribbon, light emission occurs due to the energy of the light of that wavelength. Namely, the label 64 is a so-called stealth bar code which is printed on the photographic print 62 as an invisible image (Hereinafter, this photographic print 62 will be called "photographic print 62B").

Accordingly, because visible light passes through as is, even if the label 64 is printed so as to be superposed onto the image, the image formed on the photographic print 62 (62B) is not partially hidden or the like and thus not damaged. Further, it is difficult to confirm with the naked eye whether or not the label 64 is printed on the photographic print 62B, and thus the information recorded as the label 64 is read only when necessary.

The printed portions of the label 64 emit light as a result of invisible light being irradiated thereon. Thus, by irradiating light which includes invisible light, and by using a filter which removes the reflected light and allows the light of the light-emitted wavelength to pass through, the printed portions which are the light emitting portions, i.e., the symbol of the label 64 which is the two-dimensional bar code, can be read.

As shown in FIG. 3, a receiving box 134 is provided at the print order receiving machine 102. When the photographic prints 62B, on which the label 64 is printed, are sent out from the printing section 106, the photographic prints 62B are collected in the receiving box 134.

Accordingly, the photographic print 62B which is received by the print order receiving machine 102 is delivered to the print processing device 10 as shown in FIG. 1.

The schematic structure of the print processing device 10 which is applied to the first embodiment is shown in FIG. 5. As shown in FIG. 5 and FIG. 6, the print processing device 10 is equipped with an image processing device 12 and a printer processor 18. The printer processor 18 scan-exposes the photographic printing paper 50 (refer to FIG. 7), which is a kind of photographic photosensitive material, as an image recording medium in accordance with the image data (digital image data) which is processed at the image processing device 12. Accordingly, the photographic print 62, on which an image corresponding to the image data is formed, is obtained.

As shown in FIG. 5, at the print processing device 10, a general structure is used in which a photographic print is prepared from an image which is formed on a photographic film 20 such as a negative film or a reversal film or the like, or from image data which is recorded on an image storage medium or the like such as a smart media 24 or the like. At the print processing device 10, the image data which corresponds to the image which is recorded on the photographic film 20 or the image data which is recorded on the smart media 24 is inputted to the image processing device 12.

To this end, a film scanner 22 which reads the images which are recorded in the respective image frames of the photographic film 20, and a media drive 26 which reads the image data which is recorded on the smart media 24, and the like are connected to the image processing device 12.

The film scanner 22 reads the images of the respective image frames which are recorded on the photographic film 20 such as a 135 film or an APS film or the like, and outputs the image data. The print processing device 10 is equipped with an unillustrated film processor, and is prepared in advance so as to be capable of carrying out developing processing before the photographic film 20, on which images have been photographed by a camera or the like, is loaded into the film scanner 22.

When the smart media 24 which is used in a digital still camera or the like is to be applied to the media drive 26, this smart media 24 is loaded in the media drive 26. Accordingly, the image data, which has been photographed by a digital still camera and stored in the smart media 24, is read-in by the image processing device 12. Not only the smart media 24, but also suitably selected recording media which are conventionally known can be used, and the media drive 26 which corresponds to the storage media which is applied is used. Further, the image data which is recorded on the smart media 24 is not limited to image data of an image which is photographed by a digital still camera or the like, and a variety of image data, such as image data obtained by editing by a personal computer of an image which has been photographed by a digital video camera or the like, can be used.

The image processing device 12 is equipped with an image memory 30. The image data which are inputted from the film scanner 22, the media drive 26 and the like are stored in the image memory 30.

An image processing section 38, which is structured by a color gradation processing section 32, a hyper-tone processing section 34, a hyper-sharpness processing section 36, and the like and which carries out various image processings, is provided at the image processing device 12. The image processing device 12 carries out various image processings on the image data which is recorded in the image memory 30, by the color gradation processing section 32, the hyper-tone processing section 34, the hyper-sharpness processing section 36, and the like.

Further, a pre-scanning processing section 90, a processing condition setting section 92, and an order information processing section 94 are provided at the image processing device 12. Moreover, as shown in FIG. 6, a keyboard 12K and a monitor 12M are provided at the image processing device 12.

In the image processing device 12, when image data is read by the film scanner 22 or a scanner which will be described later or the like, for example, after pre-scanning in which the image is read at a low resolution is carried out, fine scanning in which the image is read at a high resolution is carried out. Various processing conditions are set on the basis of the image data which is read in the pre-scanning, and image processings on the image data which is read in the fine scanning are carried out on the basis of the set processing conditions. At this time, an image which is based on the image data which is read in the pre-scanning is displayed on the monitor 12M. It is possible to set the image processing conditions and the like and to confirm the settings while viewing this display image.

For example, an order information inputting machine (not shown) is connected to the order information processing section 94. When a photographic film 20 (undeveloped) which has been used for photography, is brought in, or when the smart media 24 on which image data is stored is brought in and the preparation of the photographic print 62 is requested, a variety of general order information, such as information which enables the person who places the order to be specified such as the name of person who places the order or the like, the print size, the finish such as glossy or mesh or the like, the number of prints, and the like, are inputted.

The processing condition setting section 92 also carries out setting of processing conditions of the image data which is based on the order information which is inputted to the order information processing section 94. Accordingly, the image processing section 38 carries out processing on the image data which is based on the order information. Further, the number of prints, the finish, the print size, and the like are outputted as the print conditions along with the image data to the printer processor 18.

Namely, at the pre-scanning processing section 90, in accordance with the processing conditions which are inputted to the processing condition setting section 92 by key operation of the keyboard 12K or in accordance with the processing conditions which are automatically set on the basis of image data which is set in advance or which is pre-scanned, a variety of processings which are conventionally known, for example, gray balance adjustment, gradation adjustment, density adjustment, saturation adjustment, sharpness (sharpening) processing, dodging processing, electronic magnification changing processing, geometrical processing, peripheral light amount correcting processing, soft focusing processing, red-eye correcting processing, and the like are carried out, and an image which corresponds to the processed image data is displayed on the monitor 12M. Further, the processing condition setting section 92 controls the image processing section 38 on the basis of the processing conditions, and carries out the processing on the image data which is read by fine scanning.

As shown in FIG. 5 and FIG. 6, the printer processor 18 is structured by a digital printer 42 and a paper processor (hereinafter called "processor 44").

The image processing device 12 and the printer processor 18 are connected by an interface, for example, an IEEE1394 standard or the like. The image data for which processing at the image processing device 12 has been completed and the order conditions are outputted to the printer processor 18. Accordingly, the printer processor 18 can carry out print processing based on this order information, such as, for example, selecting the photographic printing paper 50 in accordance with the print size and the finish, and exposing the selected photographic printing paper 50 in accordance with the image data, and the like.

Figure 7:
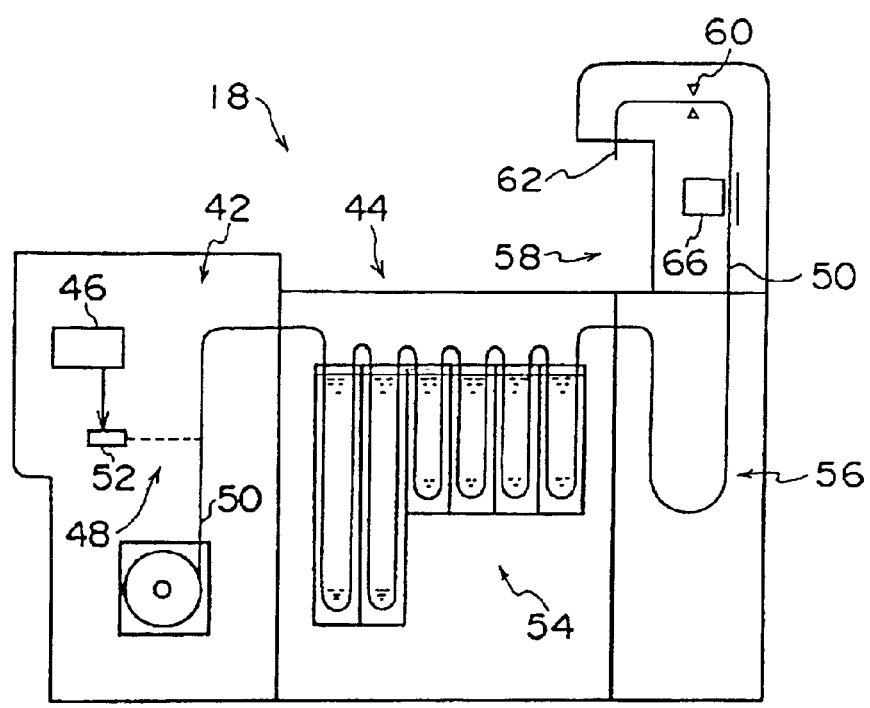
FIG. 7 is a schematic structural view showing an example of a printer processor.

As shown in FIG. 7, the digital printer 42 which is provided at the printer processor 18 is equipped with an image memory 46 and an exposure section 48, and once stores the image data which is inputted from the image processing device 12 in the image memory 46 all at once.

The photographic printing paper 50, which serves as an image recording medium, is loaded in the exposure section 48 of the digital printer 42. When the image data is inputted, the photographic printing paper 50 which is in roll-form is pulled out from the outer peripheral end thereof, and the photographic printing paper 50 is exposed in accordance with the image data. The photographic printing paper 50, on which the image has been exposed, is sent out to the processor 44.

For the exposure section 48, a general structure can be used which is provided with, for example, laser light sources 52 of respective colors of R, G, B, and a scanning optical system (not shown) which is structured by a polygon mirror, an fθ lens, and the like. This structure exposes the photographic printing paper 50 in accordance with the image data due to laser light of the respective colors of R, G, B being irradiated thereon (main-scanned) in accordance with the image data from the laser light sources 52 while the photographic printing paper 50 is sub-scanned at a constant speed.

The processor 44 is a general structure which is equipped with a processing solution processing section 54, a drying section 56, and a sorter section 58. The processor 44 carries out processing solution processings, such as color development, bleaching fixing, washing, and the like, on the photographic printing paper 50, and thereafter, carries out drying processing, such that the image which is exposed on the photographic printing paper 50 is made visible.

Further, a cutter 60 is provided at the processor 44. The photographic printing paper 50, for which drying processing has been completed, is cut into the respective images, and is discharged to and collected in the sorter section 58 as the photographic prints 62. Due to the image data for an index print, at which images of one photographic film 20 or images (image data) of one smart media 24 are arranged in matrix-form, being inputted from the image processing device 12, the printer processor 18 exposes the photographic printing paper 50 in accordance with the image data, and discharges the photographic printing paper 50 to the sorter section 58 as an index print.

On the other hand, a flat-bed scanner (hereinafter, "scanner 28") which is a reflecting type scanner is provided as an image reading means at the print processing device 10. In the print service system 100, the photographic print 62B which is received by the print order receiving machine 102 is loaded on the scanner 28.

The scanner 28 is connected to the image processing device 12. The image processing device 12 can read the image data of the image which is recorded on a reflecting document, such as the photographic print 62 (62B) or the like, by using the scanner 28. When the digital printer 42 of the printer processor 18 is equipped with a scanner function, the scanner of the digital printer 42 may be used as the scanner 28.

Figure 8:
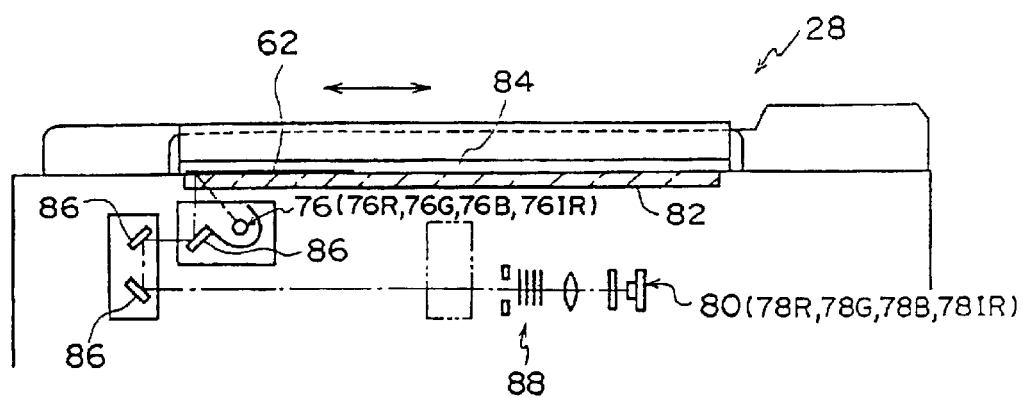
FIG. 8 is a schematic structural view of main portions showing an example of a scanner according to the first embodiment of the present invention.

An example of the scanner 28 is shown in FIG. 8. The scanner 28 has light sources 76 (76R, 76G and 76B) which emit lights of the respective colors of R, G, B toward the document image, and a CCD line sensor 80 which is formed by CCD arrays 78R, 78G and 78B which detect lights of the respective colors of R, G, B which are reflected by the document image.

The photographic print 62 is placed on a platen glass 82, which is a transparent glass, in a state in which the image surface faces downward, and the photographic print 62 is covered and sandwiched between a pressing cover 84 and the platen glass 82. Further, an optical system 88, which is structured by a plurality of reflecting mirrors 86 and various lenses and filters, is provided at the scanner 28. When the light which is irradiated from the light source 76 to the photographic print 62 is reflected by the photographic print 62, the light is further reflected by the plurality of reflecting mirrors 86. Moreover, the light is focused at the CCD line sensor 80 by being passed through the optical system 88. Further, by moving (sub-scanning) the light source 76 and the plurality of reflecting mirrors 86 relatively with respect to the photographic print 62 such that the optical path lengths of the photographic print 62 and the CCD line sensor 80 are constant, the image which is formed on the photographic print 62 is read by the CCD line sensor 80.

The scanner 28 A/D converts the image which is read by the CCD line sensor 80, and outputs the image as image data. Further, at the scanner 28, after the pre-scanning in which the image is read at a low resolution is carried out, the fine scanning in which the image is read at a high resolution is carried out. Accordingly, the image data which is read by the pre-scanning and the image data which is read by the fine scanning are inputted to the image processing device 12.

It is possible to carry out only fine scanning at the scanner 28, and for the image data read by the fine scanning to be converted to image data of a low resolution at the scanner 28 or the image processing device 12, and to use this data as pre-scanned image data. Further, a reflection-type image reading device of a general structure which reads images recorded on a reflection original can be used as the scanner 28. In the present embodiment, detailed description thereof is omitted.

On the other hand, a light source 76IR, which emits invisible light of a predetermined wavelength which corresponds to the label 64 which is printed on the photographic print 62B (hereinafter, "infrared light" is used as an example of such light), is provided at the scanner 28. Further, the CCD line sensor 80 is equipped with a CCD array 78IR which senses light (hereinafter, "infrared light" is used as an example of such light) which the label 64 emits when the light is irradiated from the light source 76IR.

The scanner 28 reads, as image data, the symbol of the label 64 recorded on the photographic print 62B, and outputs it to the image processing device 12.

A decoder section 74 is provided at the image processing device 12. The image data of the label 64 is inputted to the decoder section 74. At the decoder section 74, the order information, which has been made into a two-dimensional bar code and recorded on the photographic print 62B, is re-stored on the basis of the image data of the label 64, and is outputted to the order information processing section 94.

The order information processing section 94 outputs, to a processing condition setting section 92, the processing conditions for processing of the image data of the photographic print 62B from the order information inputted from the decoder section 74. Accordingly, at the image processing section 38 of the image processing device 12, image processing based on the order information recorded on the photographic print 62 is carried out on the image data of the photographic print 62 which is read by the scanner 28.

Further, the order information read at the order information processing section 94 is sent to the digital printer 42 of the printer processor 18. Accordingly, at the digital printer 42, image exposure based on the order information is possible. It is possible to prepare a photographic print 62 (hereinafter "photographic print 62A") which, in accordance with the order conditions inputted at the print order receiving machine 102, is a copy of the image formed on the photographic print 62B (62).

On the other hand, an encoder section 72 is provided at the image processing device 12. Further, as shown in FIG. 5 and FIG. 7, a label writer 66 is provided at the processor 44 of the printer processor 18. In the same way as the label writer 130 of the print order receiving machine 102, the label writer 66 prints a label (hereinafter, "label 68") with an invisible image onto the image surface of the photographic print 62.

At the time of carrying out additional print processing of the image of the photographic print 62B, the order information processing section 94 outputs to the encoder section 72, the order information recorded on the photographic print 62B, as well as information, which relates to the processing conditions at the print processing device 10 such as the exposure conditions at the time of exposing the photographic printing paper 50 on the basis of this image data and the like, and information showing that the image is a copied image (hereinafter called "copy information"). The encoder section 72 encodes the copy information in a two-dimensional bar code (makes the information into a two-dimensional bar code), and outputs it to the label writer 66.

Accordingly, information, which expresses that the print is a copied photographic print, is recorded on the copied photographic print 62A in addition to the order information and the processing information.

The image processing device 12 may store the image data, which is read by the film scanner 22 or the scanner 28, in a hard disk. Alternatively, the image processing device 12 may be connected to an unillustrated image server via a network or the like, and may store the image data in the image server.

Hereinafter, the flow of processing of a request to additionally print an image formed on the photographic print 62 by using the print order receiving machine 102 will be described as operation of the first embodiment.

Figure 9:
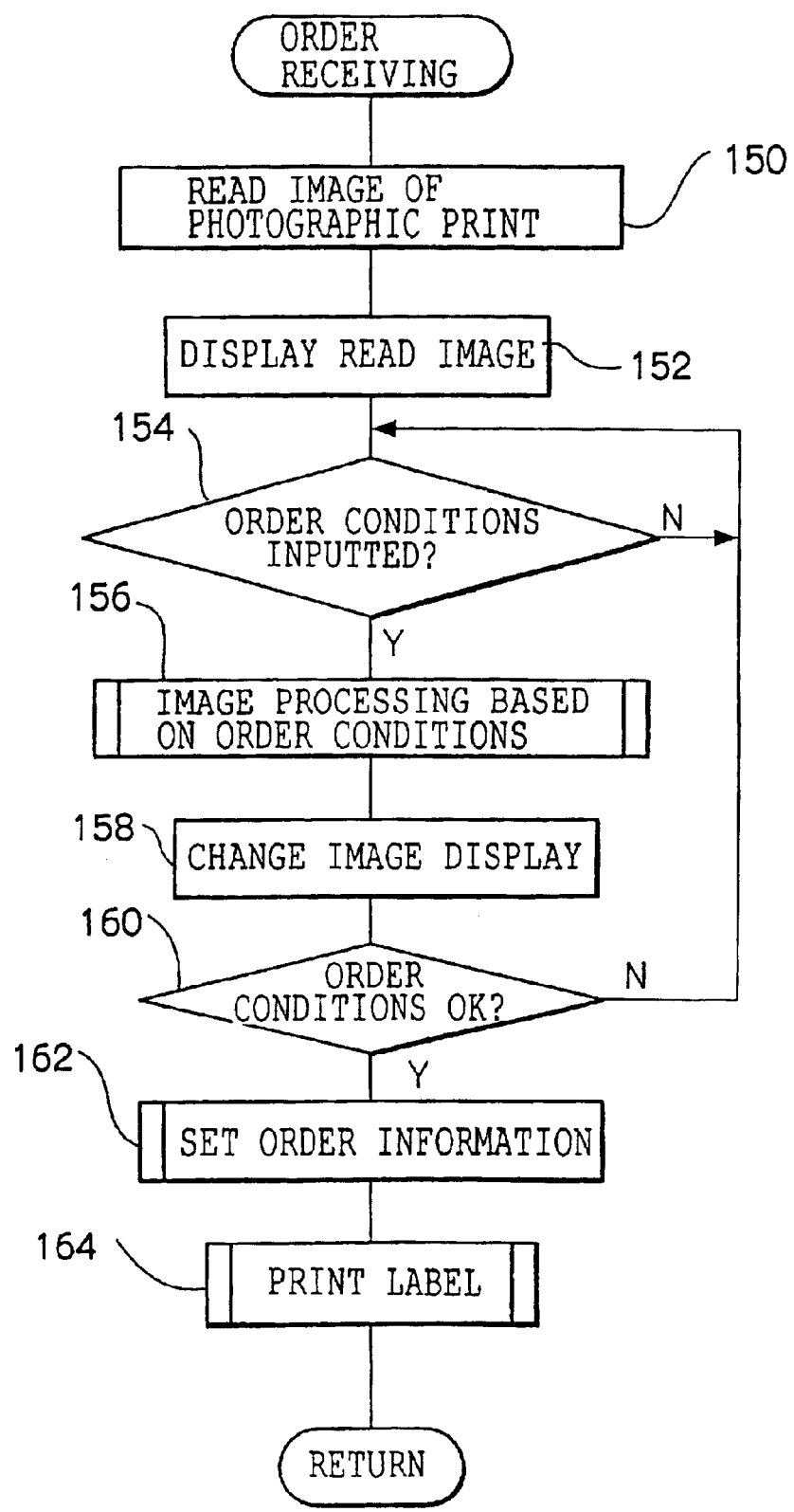
FIG. 9 is a flowchart showing an overview of order receiving.

The flow of processing of receiving an additional printing order at the print order receiving machine 102 which is provided at the print service system 100 is shown in FIG. 9.

In this flowchart, processing starts when the photographic print 62, for which the person who places the order requests additional printing, is inserted into the unillustrated insertion opening. At a first step 150, while the photographic print 62 is being conveyed at a constant speed by the conveying belt 108, the image which is formed on the photographic print 62 is read.

Thereafter, at step 152, an image based on the read image data is displayed on the monitor 122. Namely, the image which is formed on the photographic print 62 is displayed on the monitor 122. Accordingly, it is possible to input the order conditions by key operation of the operation panel 124 while viewing the image which is displayed on the monitor 122.

At next step 154, it is confirmed whether the order conditions have been inputted or not. If the order conditions have been inputted and the judgement at step 154 is affirmative, the routine moves onto step 156 where various parameters are set on the basis of the inputted order conditions, and image processing is carried out. Further, at step 158, the display of the monitor 122 is changed in accordance with the image-processed image. Namely, the image which is processed on the basis of the order conditions is displayed on the monitor 122.

Further, at step 160, it is confirmed whether a desired image is displayed or not on the monitor 122, namely, it is confirmed whether the order conditions have been able to be set so as to obtain a desired image or not. If the determination at this step 160 is affirmative, the routine moves onto step 162, and the order information is set on the basis of the inputted order conditions and the processing conditions for carrying out the image processing. When a desired image is not obtained (a negative determination at step 160), inputting of the order conditions (changing of order conditions) is carried out.

The order information which is set in this way is converted into a two-dimensional bar code at step 164, and is printed onto the photographic print 62 as the label 64 which is an invisible image. Because the label 64 is printed on the photographic print 62B as an invisible image of a two-dimensional bar code (a stealth bar code), even if the label 64 is printed on the image surface of the photographic print 62B, the image formed on the photographic print 62B is not damaged.

Accordingly, the photographic print 62 is transferred to the print processing device 10 as the photographic print 62B on which the order information is recorded.

Figure 10:
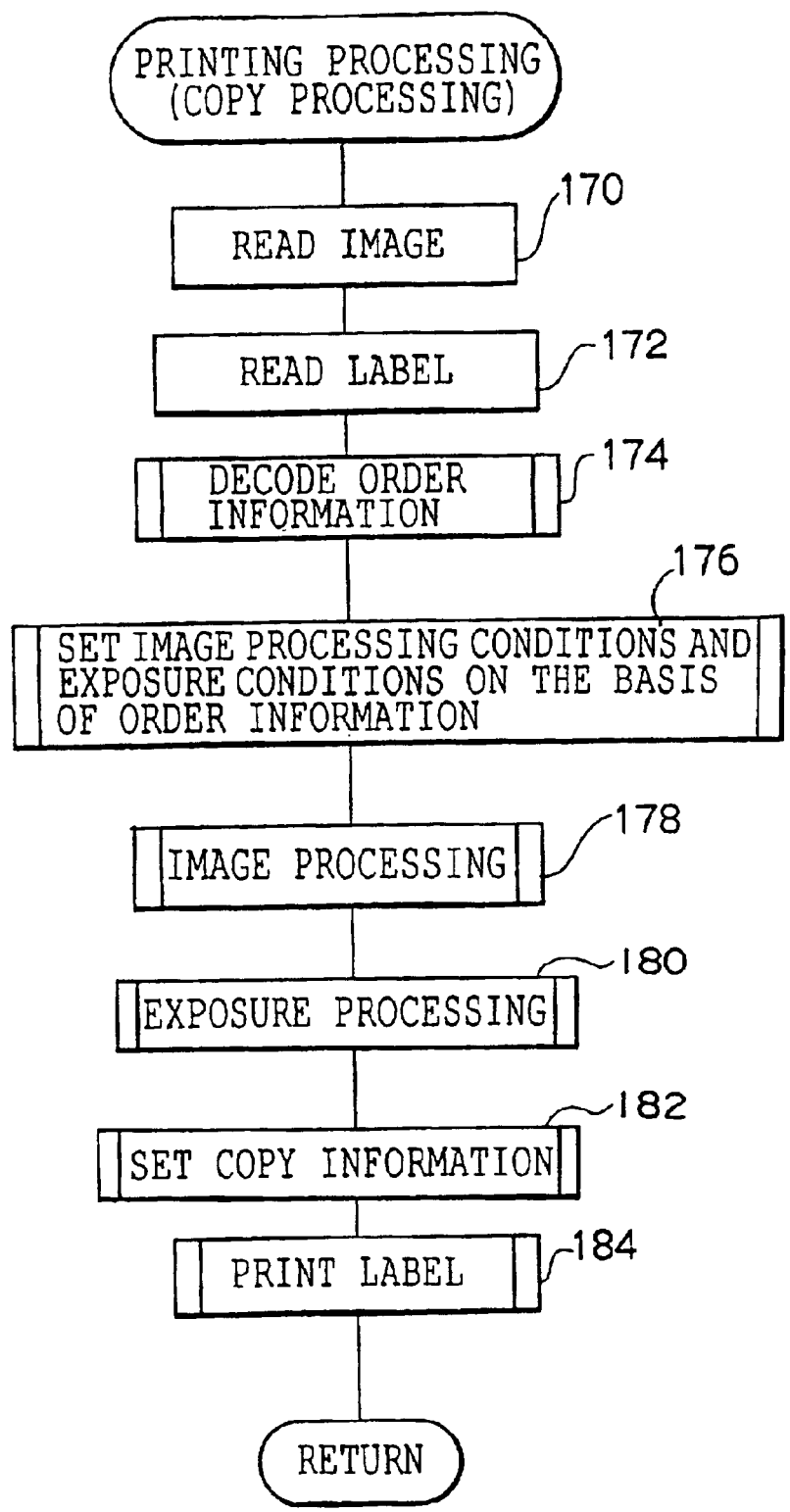
FIG. 10 is a flowchart showing an overview of print processing for an order which is received at the print order receiving machine.

The flow of processing on the photographic print 62B in the print processing device 10 is shown in FIG. 10.

In this flowchart, the photographic print 62B which is received at the print order receiving machine 102 is loaded on the scanner 28, and when the start of print processing is instructed, the processing is executed. At initial step 170, the image of the photographic print 62 which is loaded on the scanner 28 is read.

Along with the image data of the respective colors of R, G, B in step 170, the scanner 28 reads, as image data, the symbols on the label 64 which is recorded as an invisible image (step 172). At this time, because the label 64 is recorded on the image surface of the photographic print 62B, the label 64 can be smoothly read along with the image which is formed on the photographic print 62B, without reloading the photographic print 62B.

When the image reading of the photographic print 62B is completed, first, at step 174, the symbols of the label 64 are decoded, and the order information which is recorded on the photographic print 62B is read. At step 176, the processing conditions for carrying out the image processing are set on the basis of the order information, and the exposing conditions for exposing the photographic printing paper 50 are set on the basis of the image data.

Thereafter, at step 178, on the basis of the processing conditions which are set on the basis of the order conditions, image processing is carried out on the image data of the image formed on the photographic print 62B which is read by the scanner 28. Pre-scanning may be carried out by the scanner 28, and image processing which is set in advance may be carried out on the pre-scan image data, and the basic processing conditions may be set, and the image processing may be carried out on the basis of the processing conditions which are based on these processing conditions and the order conditions. Alternatively, the basic processing conditions may be set as the order information, and the pre-scanning may be omitted, and image processing may be carried out on the image data which is obtained by the fine scanning.

If the image processing is carried out in this way, at the next step 180, the image exposure onto the photographic printing paper 50 is carried out by using the processed image data.

On the other hand, at step 182, the copy information is set on the basis of the order information which is recorded on the photographic print 62B and the image processing information and the exposure information at the print processing device 10. At the next step 184, the copy information is encoded into a two-dimensional bar code, and is printed onto the photographic print 62 as an invisible image. Accordingly, a photographic print 62A on which the copying history is recorded is obtained.

The photographic print 62A which is prepared in this way is delivered, together with the photographic print 62 (62B) which was received by the print order receiving machine 102, to the person who, as indicated by the order information, placed the order.

Accordingly, at the print service system 100, a person placing an order can place an order for additional prints while viewing the finished image on the print order receiving machine 102. Thus, PTP (Print to Print) processing can be easily and reliably carried out. A photographic print 62A, on which is formed (copied) an image corresponding to the order request can be obtained the person who placed the order.

Further, at the print processing device 10, various types of processing conditions are set when a person orders additional printing. Thus, print processing can be carried out smoothly.

Moreover, because copy information is also recorded on the photographic print 62A which is additionally printed, the order history and the fact that the print is a copied photographic print is clear from the copy information.

In the first embodiment, the copying history is recorded on the photographic print 62A which is prepared in accordance with the order request. However, it is possible for the copy information to only be information which clarifies that the photographic print 62 has been obtained by additional printing. Alternatively, it is possible that the copying history may not be recorded.

Further, in the first embodiment, the order information is recorded as a stealth bar code on the image surface of the photographic print 62A. However, the recording of the order information is not limited to the same. For example, the order information may be printed (on the back of the print) as a visible image, as a one-dimensional bar code or a two-dimensional bar code on the reverse surface of the photographic print 62. Alternatively, the order information may be recorded in a non-image portion such as the margin portion at the periphery of the image or the like. Moreover, the order information is not limited to a bar code, and may be printed on the basis of a code which is set in advance. When converting the order information into a predetermined code, an electronic invisible ink method may be used. In this case, the visible image which is printed on the back may be read at the scanner 28 or the like of the print processing device 10.

It suffices that the print order receiving machine at least be a structure in which the person who brings in the photographic print 62 to place the order can himself/herself carry out the order receiving processing. Accordingly, staff for receiving orders for additional printing are not needed, and order receiving processing which is more labor-efficient is possible. Further, by making the receiving processing more labor-efficient, an extension of the time at which orders can be received and an increase in the locations at which orders can be recorded is possible, and the convenience for persons placing orders can be improved.

Figure 11:
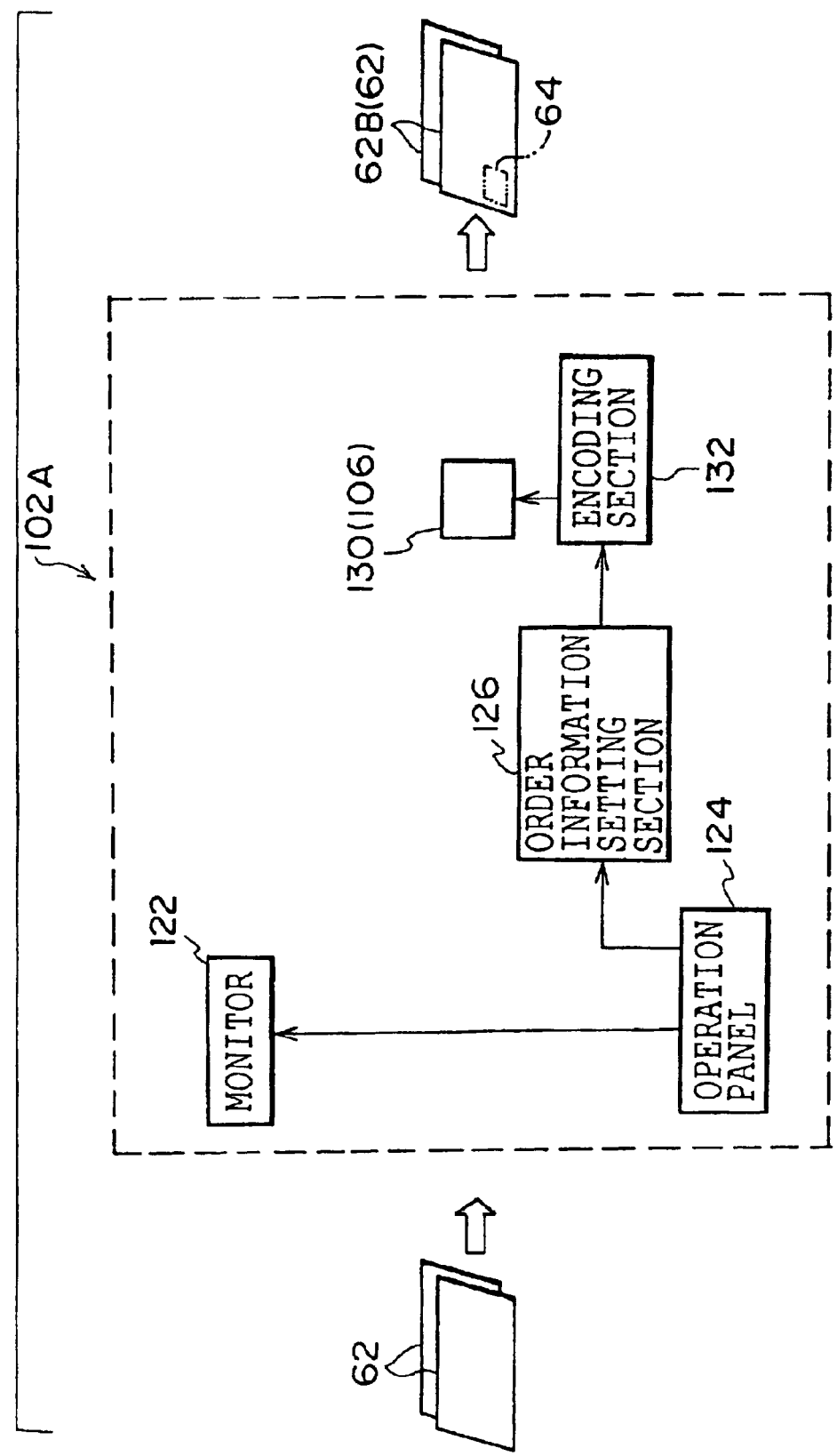
FIG. 11 is a schematic structural view showing another example of a print order receiving machine according to the present invention.

An example of a print order receiving machine in which at least labor-efficiency and an improvement in convenience for the person who places the order are possible is shown in FIG. 11. In a print order receiving machine 102A, the scanner section 104, the image memory 118, and the image processing section 120 are omitted. In the print order receiving machine 102A, various items such as the order conditions and the processing conditions for the image and the like are displayed on the monitor 122. It is possible to input the order conditions and the processing conditions by key operation of the operation panel 124 while viewing the display of the monitor 122. Further, it is possible to check the set order conditions and processing conditions on the display of the monitor 122.

The order information setting section 126 sets the order information from the order conditions and the processing conditions which are inputted by key operation of the operation panel 124.

Further, due to the photographic print 62 being inserted from the unillustrated insertion opening of the print order receiving machine 102A, the photographic print 62 is sent to the printing section 106. At this time, in the printing section 106, for example by the label writer 130, a two-dimensional bar code based on the order information is printed on the photographic print 62 as an invisible image, and an additional printing order is received. Accordingly, the photographic print 62B on which the order information is recorded is obtained.

The print order receiving machine 102A, which can receive orders without the need for workers, can be set at any suitably selected place. Further, the print order receiving machine 102A, can receive orders at any time (24 hours), and thus, an improvement in convenience for a person who places an order for additional printing is possible.

There are glossy, raster, silk, and the like types of the finished surface of the photographic print 62. According to the type of the finished surface, the surface state (whether there is embossing or the like or not, or the size or the like) differs, and the reflectivity of light at the time of reading the image at the scanner section 104 or by the scanner 28 slightly differs. This difference in the reflectivity of light corresponding to the surface state affects the image data and the processing conditions. Thus, there are cases in which the image which is formed on the photographic print 62A varies.

By carrying out a filtering process or the like so as to correspond with the surface state of the photographic print 62, the surface of the photographic print 62A which has been copied is not affected by the surface state of the photographic print 62.

Figure 12:
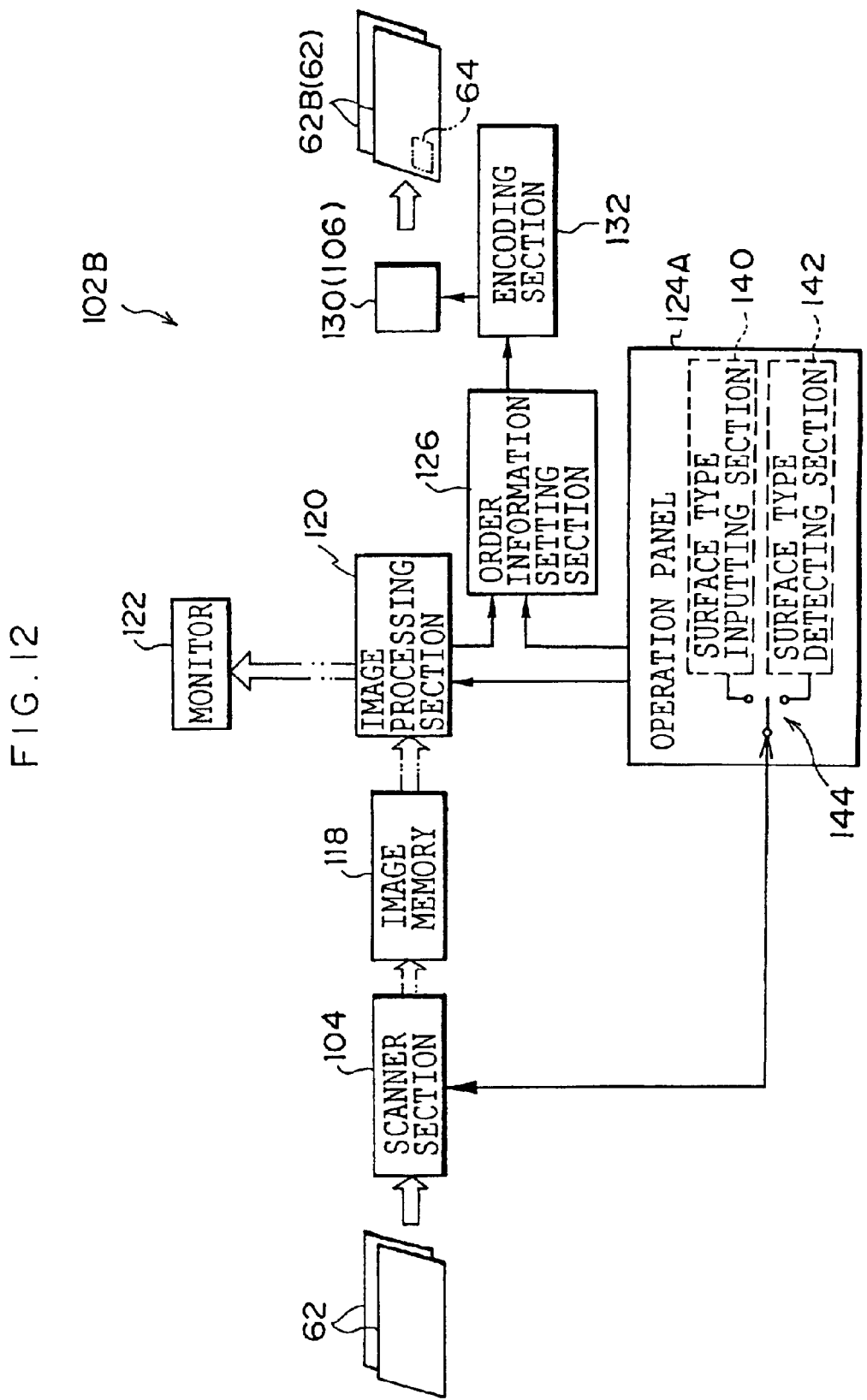
FIG. 12 is a schematic structural view showing yet another example of a print order receiving machine according to the present invention.
Figure 13:
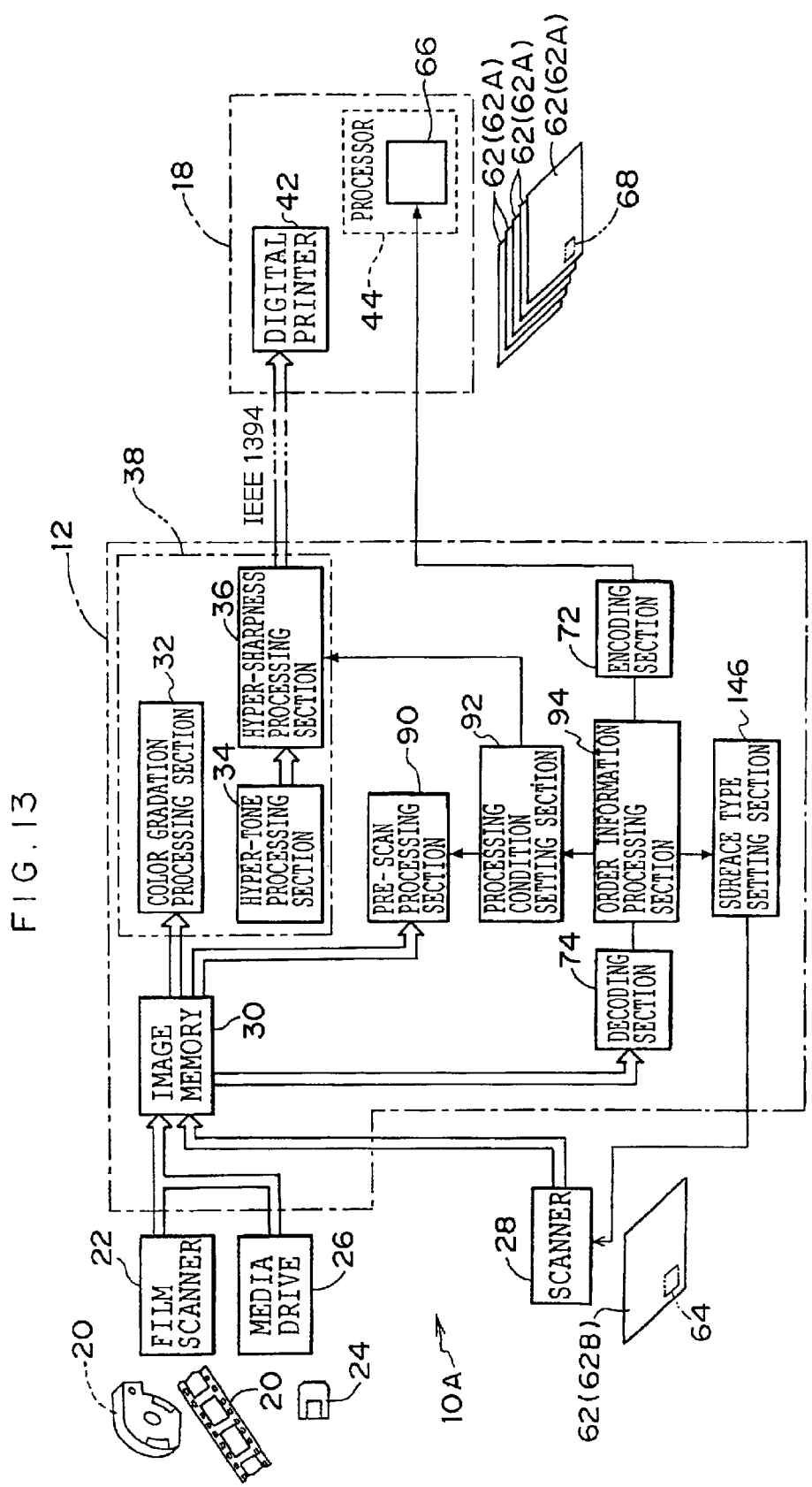
FIG. 13 is a schematic structural view showing an example of a print processing device for the print order receiving machine shown in FIG. 12.

Here, the schematic structures of a print order receiving machine 102B and a print processing device 10A which enable appropriate processing which corresponds to the state of the surface of the photographic print 62 are shown in FIG. 12 and FIG. 13.

In the print order receiving machine 102B which is shown in FIG. 12, a surface type inputting section 140 and a surface type detecting section 142 are provided at an operation panel 124A, and are switched by operation of a switching switch 144. Namely, due to the surface type input (the surface type inputting section 140) being selected by operation of the switching switch 144, the surface type of the photographic print 62 (for example, glossy, raster, silk, or the like) can be manually inputted by operation of an unillustrated key of the operation panel 124A.

Further, when surface type detection (the surface type detecting section 142) is selected by the switching switch 144, at the time of reading, at the scanner section 104, the image formed on the photographic print 62, the surface type detecting section 142 determines the type of the surface of the photographic print 62 from the state of reflection of the light which is irradiated on the photographic print 62.

On the other hand, at the scanner section 104, when the type of the surface is determined by manual input or automatic detecting, at the time of reading the image formed on the photographic print 62, a filtering processing which is set in advance in accordance with the type of the surface is carried out. Accordingly, image data which is not affected by the type of the surface of the photographic print 62 is stored in the image memory 118.

Further, in the order information setting section 126, the order information which includes the type of the surface is set, and a two-dimensional bar code which corresponds to the order information which is set is printed onto the photographic print 62 as an invisible image. Namely, the order information including the surface type information is recorded onto the photographic print 62B.

An example of a print processing device which carries out the processings of the photographic print 62B, in which the surface type information is included in the order information, is shown in FIG. 13. A surface type setting section 146 is provided at the image processing device 12A of the print processing device 10A. The surface type information which is included in the order information is inputted to the surface type setting section 146 by the order information being read from the image data of the invisible image which is read by the scanner 28.

The surface type setting section 146 sets the type of the surface of the photographic print 62B at the time the image is read by the scanner 28 on the basis of the surface type information. When reading the image which is recorded on the photographic print 62B, the scanner 28 carries out filtering processings and the like which are set in advance in accordance with the type of the surface.

Namely, in the print processing device 10A, when the photographic print 62B is loaded in the scanner 28, first, the label 64 which is formed on the photographic print 62B as an invisible image is read. Thereafter, the order information is read from the image of the label 64, and surface type setting is carried out on the basis of the order information.

Thereafter, when the image which is formed on the photographic print62B is read (pre-scanning and fine scanning), filtering processing which is set in accordance with the type of the surface is carried out.

Accordingly, appropriate image data which is not affected by the type of the surface of the photographic print 62B is stored in the image memory 30, and copying processing onto the photographic printing paper 50 can be carried out on the basis of the image data.

The print order receiving machine 102B is structured such that the setting of the type of the surface of the photographic print 62 can be switched from a manual setting to an automatic setting. However, the present invention is not limited to this structure, and the surface type setting may be carried out by at least either one of a manual setting or an automatic setting.

Further, in the print processing device 10A, the type of the surface is set on the basis of the order information which is recorded on the photographic print 62B. However, automatic detecting of the type of the surface may be carried out by the scanner 28 or the image processing device 12A, and reading and processing of the image which is formed on the photographic print 62B may be carried out on the basis of the results of detection. Therefore, even when surface type information is not included in the order information, appropriate print processing in accordance with the type of the surface is possible.

Figure 14:
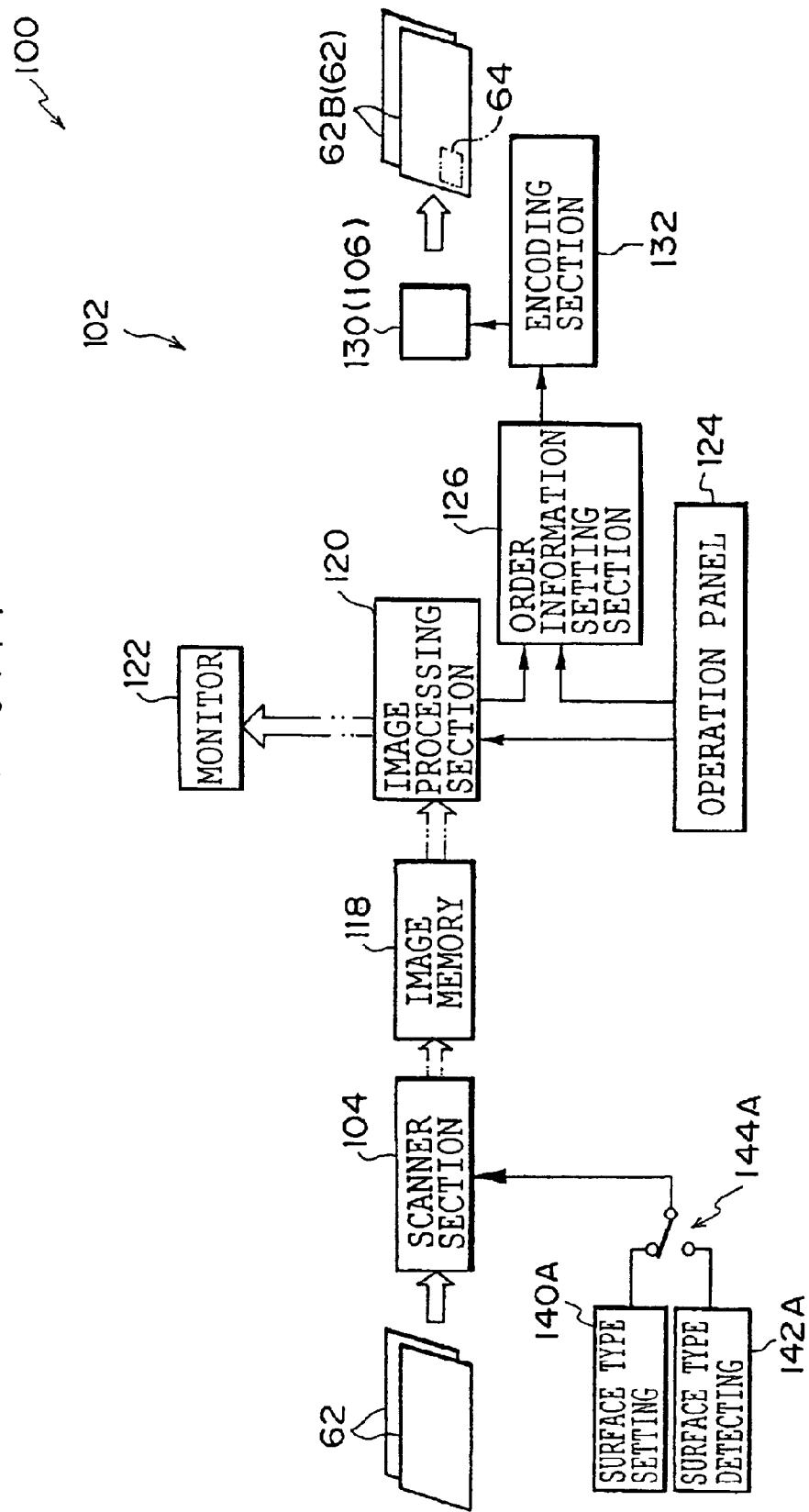
FIG. 14 is a schematic structural view showing another example of a print order receiving machine according to the present invention.
Figure 15:
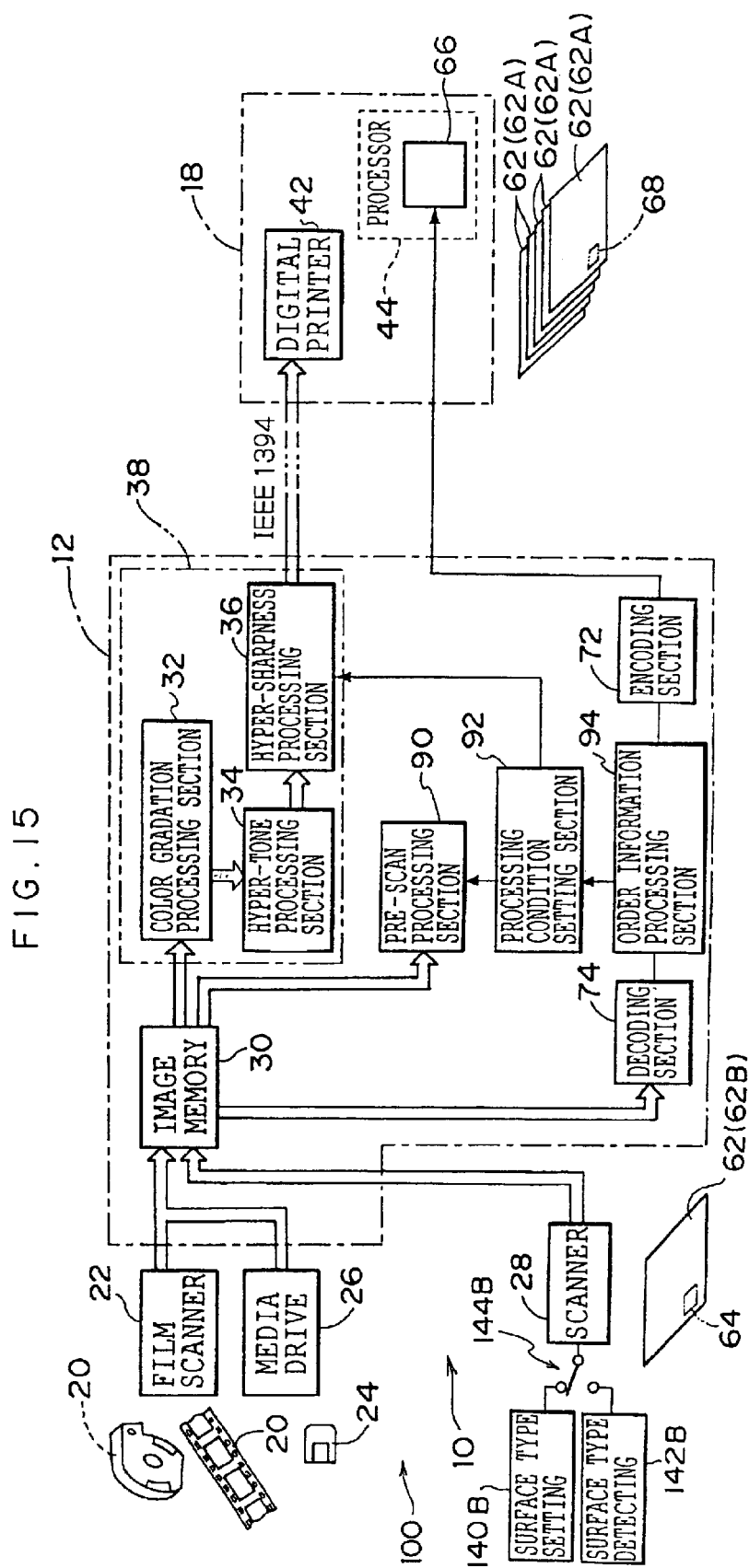
FIG. 15 is a schematic structural view showing another example of a print processing device according to the present invention.

As shown in FIG. 14, the print order receiving machine 102 may be a structure in which a switch 144A, a surface type detecting means 142A, and a surface type setting means 140A are provided at the scanner section 104. Further, as shown in FIG. 15, the print processing device 10 may be a structure in which a switch 144B, a surface type setting means 140B and a surface type detecting means 142B are provided at the scanner 28 which is connected to the image processing device 12.

In the surface type setting means 140A and 140B the type of the surface of the photographic print 62 (62B) is set or selected by manual operation. The surface type detecting means 142A and 142B detect and determine the type of the surface from the reflectance of light or the like when the image of the photographic print 62 (62B) is read. Further, the scanner section 104 and the scanner 28, or the surface type setting means 140A, 140B and the surface type detecting means 142A, 142B may be structured such that image correcting and the like are carried out when the image of the photographic print 62 (62B) is read on the basis of the type of surface which is set at the surface type setting means 140A, 140B, or the type of surface which is detected at the surface type detecting means 142A, 142B.

Accordingly, it is possible to appropriately switch between setting the type of the surface by manual operation or automatically detecting the type of the surface, when the reading of image which is recorded on the photographic print 62, 62B is carried out by the print order receiving machine 102 and the scanner 28 of the print processing device 10. Further, a surface type information inputting function can be also provided at the print order receiving machine 102 and the scanner 28 later.

In the first embodiment which is described above, the order information is printed on the photographic print 62. However, the structure by which the order information is borne on the photographic print is not limited to the same.

[Second Embodiment]

Hereinafter, a second embodiment of the present invention will be described. The basic structure of the second embodiment is the same as that of the above-described first embodiment. Parts which are the same as those of the first embodiment are denoted by the same reference numerals, and description thereof is omitted.

Figure 18:
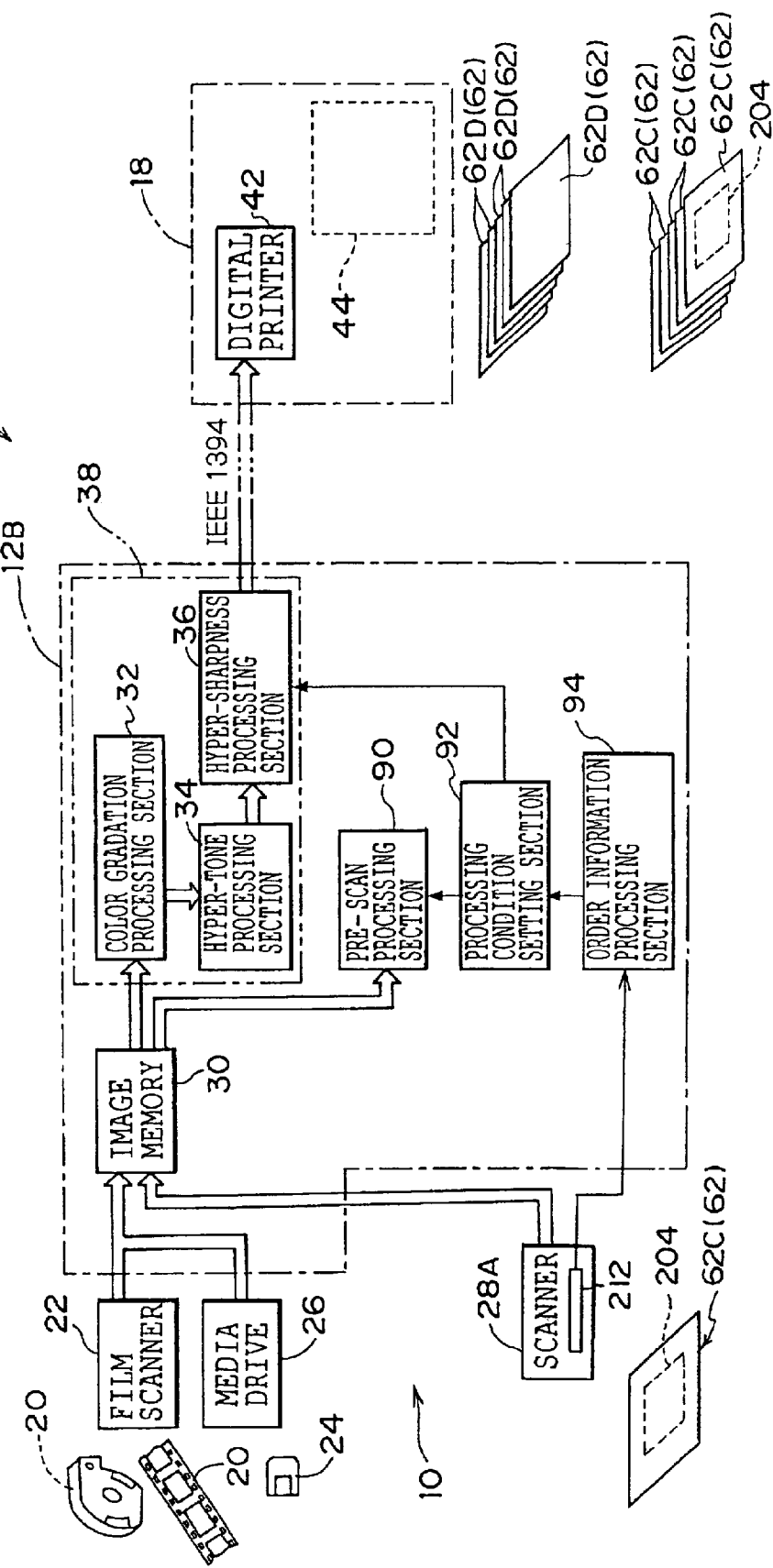
FIG. 18 is a schematic structural view of a print processing device according to the second embodiment of the present invention.

A schematic structure of a print order receiving machine 202 which is used for a print service system 200 which is applied to the second embodiment is shown in FIG. 16, and a schematic structure of a print processing device 10B which is used in the print service system 200 is shown in FIG. 18.

As shown in FIG. 16, an IC label writer 206 which writes the order information on an IC label 204 is provided in the print order receiving machine 202 which is used in the print service system 200, instead of the label writer 130 which prints the label 64 which is an invisible image. The IC label writer 206 does not contact the IC label 204, and can record various types of information.

The label writer 206 is connected to the order information setting section 126. Due to the input of order information which is set in the order information setting section 126 on the basis of the order conditions and the image processing conditions which are based on the order conditions, the order information is recorded onto the IC label 204 which is provided on each photographic print 62.

Figure 17A:
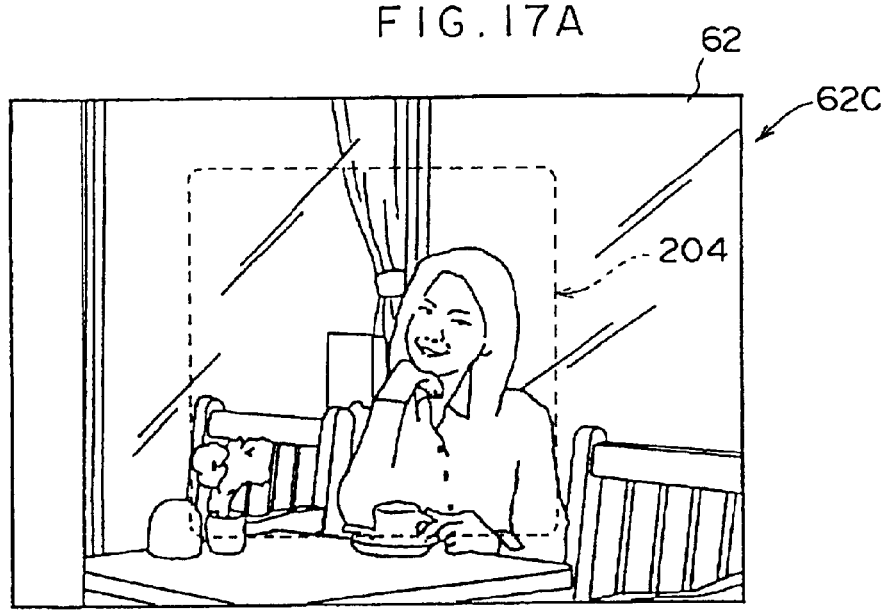
FIG. 17A is a schematic view of a photographic print which is received at the print order receiving machine according to the second embodiment of the present invention.
Figure 17B:
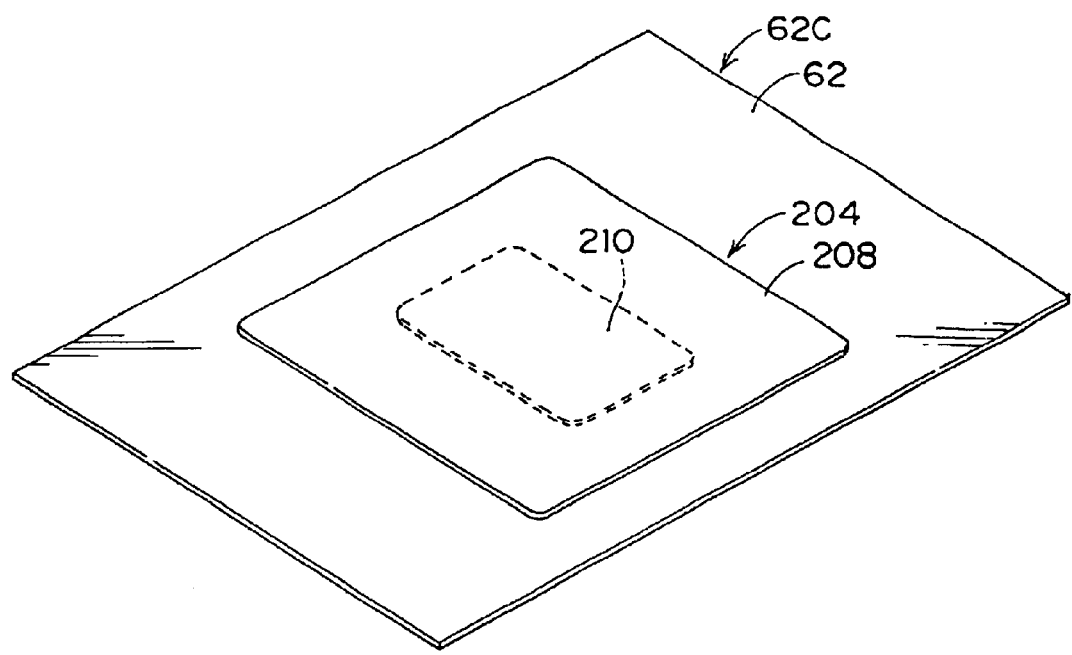
FIG. 17B is a schematic view showing an example of an IC label.

As shown in FIG. 17B, the IC label 204 of a built in module 210, which is formed by an IC chip and an antenna coil, is embedded in an outer packaging material 208 such as, for example, a non woven fabric or the like. The thickness of the outer packaging material 208 is finished to be at most about 0.4 mm.

At the IC label 204, data which is inputted via the antenna coil is recorded on the IC chip. The data which is recorded in the IC chip via the antenna coil can be outputted. Namely, at the IC label 204, it is possible to write data onto and read data from the IC chip by a non-contact method.

In the print order receiving machine 202, when the order conditions are inputted, the order information which is set on the basis of the order conditions is recorded onto the IC label 204, and the IC label 204 together with the photographic print 62 are discharged from an unillustrated discharging opening.

The person who places the order adheres the IC label 204 to the back surface side of the photographic print 62 which is discharged from the print order receiving machine 202, and places the photographic print 62 in a receiving box from an unillustrated receiving opening as a photographic print 62C which bears the order information. Accordingly, the print order receiving machine 202 receives the order to additionally print the image which is formed on the photographic print 62.

The photographic print 62C which is received in this way is transferred to the print processing device 10B. At this time, because the thickness of the IC label 204 is about 0.4 mm or less, the photographic print 62C can be generally arranged and stored by using an album or the like. Further, as shown in FIG. 17A, because the IC label 204 is adhered to the surface of the photographic print 62 at the side opposite the image surface thereof, the quality of the finish does not deteriorate due to the image which is formed on the photographic print 62 being hidden or the like.

The second embodiment describes a case in which the person who places the order adheres the IC label 204 onto the photographic print 62. However, the IC label may be automatically adhered in the print order receiving machine 202. Alternatively, the person who places the order may adhere the IC label 204 before inserting the photographic print 62 into the print order receiving machine 202, and the IC label writer 206 may record the order information onto the IC label 204 which is adhered on the photographic print 62.

Figure 19:
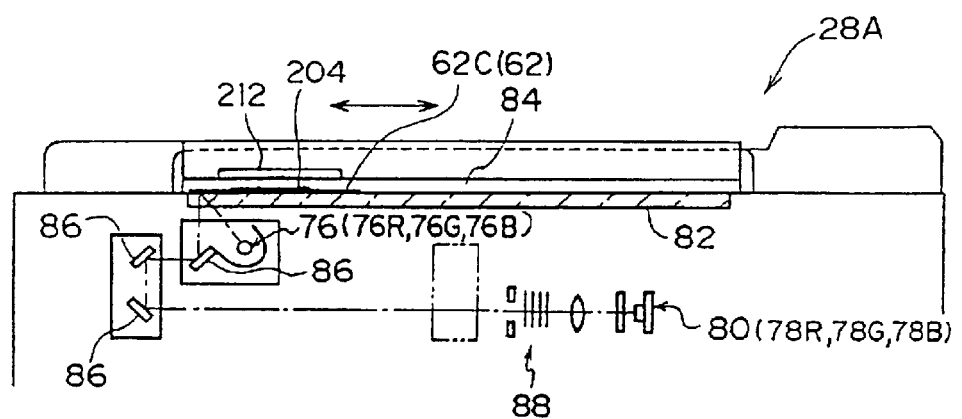
FIG. 19 is a schematic structural view of a scanner according to the second embodiment of the present invention.

On the other hand, as shown in FIG. 18 and FIG. 19, a scanner 28A which has an IC label reader 212 may be used instead of the scanner 28 which has a light source 76IR and a CCD array 78IR and the like for reading invisible images, at the print processing device 10B which is provided in the print service system 200.

As shown in FIG. 19, the IC label reader 212 is provided at, for example, a presser cover 84 or the like, so as to oppose the IC label 204, which is adhered on the reverse surface of the photographic print 62C, due to the photographic print 62C being placed on a predetermined position on a platen glass 82. The IC label reader 212 is not limited to this structure. The IC label reader 212 can be set at any suitably selected position, provided that it is a position at which it is possible for the IC label reader 212 to read the recorded data (order information) from the IC label 204 of the photographic print 62C which is placed at the scanner 28A.

The IC label reader 212 is connected to the order information processing section 94 which is provided at the image processing device 12B. Accordingly, it is possible to read the order information from the IC label 204 of the photographic print 62C which is loaded at the scanner 28A in order to read the image. When the image of the photographic print 62C is read by the scanner 28A, the IC label reader 212, at a predetermined time, reads the order information recorded on the IC label 204, and outputs the order information to the order information processing section 94 of the image processing device 12B.

Accordingly, at the print processing device 10B, additional print processing based on the order information recorded on the IC label 204 of the photographic print 62C is possible. At the print processing device 10B, the photographic print 62 (the photographic print 62D in FIG. 18) which matches the order conditions inputted at the print order receiving machine 202 can be prepared. The photographic print 62D is passed, together with the photographic print 62C, to the person who placed the order.

Accordingly, in the print service system 200 which is structured in this way, a photographic print 62D, on which an image is copied in accordance with the request (order) of the person who places the order, can be prepared.

In the second embodiment, description is given of a case in which copy information is not recorded on the photographic print 62D. However, an IC label writer may be provided at the print processing device 10B as well, and an IC label which records copy information may be adhered on the prepared photographic print 62D.

On the other hand, by using the IC label 204, the IC label 204 which records the order information in a predetermined form may be prepared by, for example, a personal home computer or the like. The IC label 204 may be adhered to the photographic print 62, and the photographic print 62 may be transferred to the print processing device 10B.

A mass storage IC chip (for example, an LSI chip), which can record data of from several M bytes to several tens of M bytes or the like, may be used as the IC label 204. Due to such a mass storage IC label (LSI label) being used, not only the order information, but also the copy history of use of the photographic print 62C and the like can be recorded onto the photographic print 62C.

Figure 20:
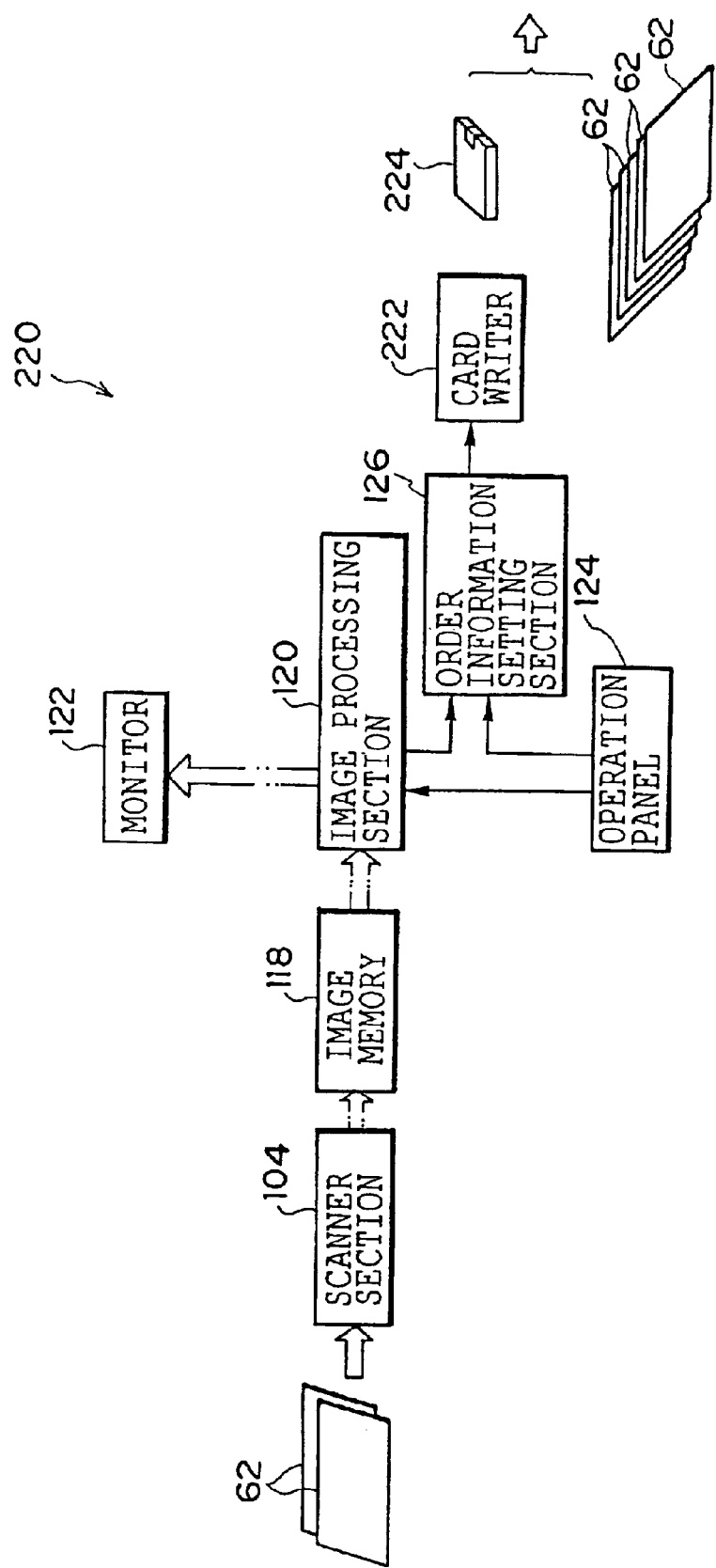
FIG. 20 is a schematic structural view showing another example of a print order receiving machine which is applied to the present invention.

The embodiments of the present invention which are described above are cases in which the photographic print 62 bears the order information. However, the present invention is not limited to the same. For example, the print order receiving machine 220 which is shown in FIG. 20 may be used.

The print order receiving machine 220 has a card writer 222. The card writer 222 records the order information onto a memory card 224 which is used as an order information recording medium. Not only an IC card or an LSI card or the like, but also a multimedia card such as a smart media or the like can be used as the memory card 224.

When an order request for the photographic print 62 is received at the print order receiving machine 220, the order information is recorded onto the memory card 224. In the print order receiving machine 220, an identification code (ID code) is given to each photographic print 62 for which an order is received, and the order information may be recorded onto the memory card 224 for each identification code. Accordingly, the order information for a large number of photographic prints 62 can be recorded by using one memory card 224.

In a case in which the print order receiving machine 220 is used, a card reader which reads the information which is recorded on the memory card 224 may be provided at the print processing device. Accordingly, the preparation of a photographic print which corresponds to the order conditions specified by the person who places the order is possible in the same way as when the respective photographic prints 62 bear the order information.

[Third Embodiment]

In the next place, a third embodiment of the present invention is explained in detail hereinafter. As mentioned previously, the surface types of the finish of a photographic print 62 wherein an image is formed on for example a photographic paper sheet or so includes glossy, luster, silk and so forth, and surface conditions vary with types.

Herein, as for the third embodiment, one example of print order receiving machine that enables appropriate image copy irrespective of surface conditions is explained hereafter.

Figure 21:
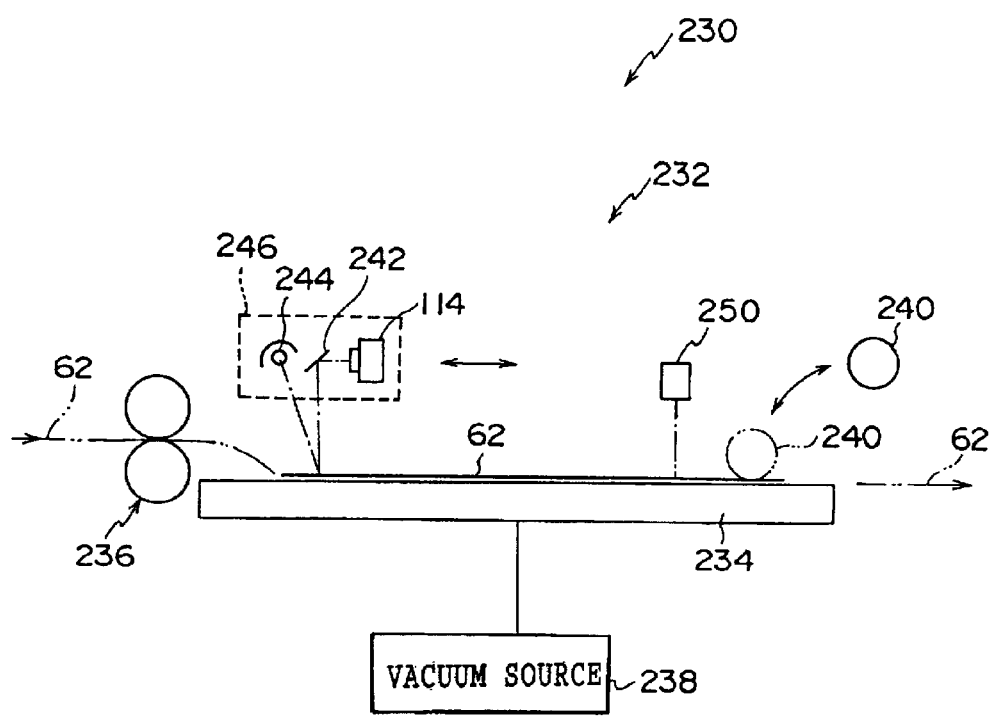
FIG. 21 is a schematic structural view of a main portion of a print order receiving machine according to a third embodiment of the present invention.

FIG. 21 shows a schematic structure of scanner section 232 arranged on a print order receiving machine 230 according to the third embodiment.

At this scanner section 232, reading stage 234 is arranged, and a photographic print 62 inserted from an insertion hole not illustrated herein is pinched by insertion roller couple 236, and placed onto the reading stage 234. At the scanner section 232, a stopper not illustrated herein is arranged at predetermined position of circumferential portion of reading stage 234 so as to go in and out, and by this stopper protruding, the photographic print 62 to be sent in by the insertion roller couple 236 is stopped and placed onto the predetermined position on the reading stage 234. This stopper retreats from the reading stage 234 when the photographic print 62 is sent out from the reading stage 234.

On this reading stage 234, an suction hole or an suction slot not illustrated herein is formed at the top surface thereof, and vacuum source 238 is connected thereto. Thereby, the photographic print 62 placed on the reading stage 234 is absorbed and held onto the reading stage 234 by negative pressure supplied from the vacuum source 238, and even if there is warp or slackness, wrinkles or so on the photographic print 62, the photographic print 62 is expanded evenly, and absorbed and held onto the predetermined position on the reading stage 234.

The suction hole and suction slot may have optional shapes, as long as when they suck the photographic print 62, internal diameter and slot width do not see concave or so on surface of the photographic print 62.

At the scanner section 232, sending roller 240 is arranged at the opposite side of the insertion roller couple 236 with insertion of the reading stage 234. This sending roller 240 normally retreats from the reading stage 240 (as shown by actual line in FIG. 21), but when processing to the photographic print 62 is completed in the scanner section 232, it moves onto the surface of the reading stage 234 (as shown in dot line in FIG. 21), and pinches the photographic print 62 between the reading stage 234 and the sending roller 240.

In this status, suction and holding of the photographic print 62 is released, and the sending roller 240 is rotated, thereby, the photographic print 62 is discharged from the reading stage 234. The transfer mechanism of the photographic print 62 is not limited to the above, and any optional structure well known to those skilled in the art may be employed.

On the other hand, at the scanner section 232 of the print order receiving machine 230, at the top of the reading stage 234 thereof, a scanning unit 246 including a reflection mirror 242 and a light source 244, and so forth, is arranged. At the scanning unit 246, a CCD line sensor 114 is arranged.

In the scanner section 232, light including color components R, G, and B is radiated to the photographic print 62 on the reading stage 234 from the light source 244. The reflection mirror 242 reflects the light to the CCD line sensor 114 according to the image radiated from the light source 244 and formed on the photographic print 62. This reflected light is formed into image on the CCD line sensor 114 via a lens and so forth not illustrated herein, thereby, the image formed on the photographic print 62 can be read.

This scanning unit 246 is of light source move method wherein the light source 244 moves to sub scanning direction, and by scanning move of this scanning unit 246, the image formed on the photographic print 62 held by the reading stage 234 is read, and image data is output.

The print order receiving machine 230 may have a monitor 122, an operation panel 124 and so forth, and a printing section 106 (Refer to FIG. 3) mentioned above at the rear of the scanner section 232, and in the place of the printing section 106, an IC label writer 206, a card writer 222 and so forth may be arranged for input and output of order information. The structure is not limited to the above, but any optional structure that enables input of order conditions and output of order information may be employed.

While, at the scanner section 232 of this print order receiving machine 230, a gloss detecting sensor 250 is arranged. This gloss detecting sensor 250 is arranged so as to face the predetermined position of the photographic print 62 sucked and held onto the reading stage 234, and radiates light beam of spot shape to the surface of this photographic print 62, and receives this reflected light. The gloss detecting sensor 250 may be optionally arranged so that it should not interfere with the scanning unit 246 and so forth, by for example retreating the scanning unit 246 at image reading, moving it so as to face the predetermined position of the photographic print 62 at luster measurement, and so forth.

Figure 22:
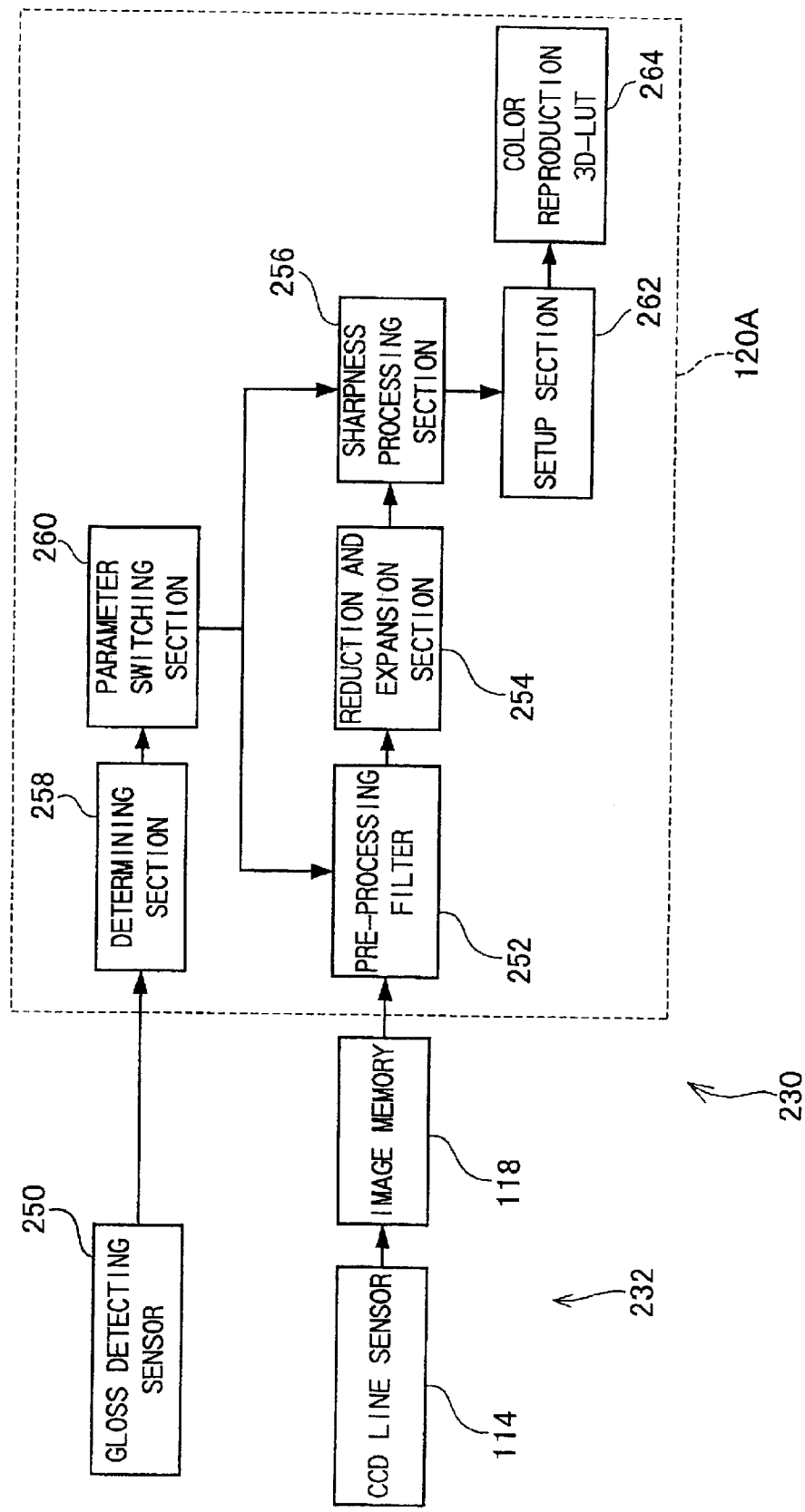
FIG. 22 is a schematic structural view of a main portion of a print order receiving machine according to a third embodiment of the present invention.

On the other hand, as shown in FIG. 22, in the print order receiving machine 230, at image processing section 120A, a preprocessing filter 252, a reduction and expansion section 254 and a sharpness processing section 256 are formed, and when the image data read by the CCD line sensor 114 is stored into the image memory 118, a predetermined image processing is carried out from this image memory 118 at the preprocessing filter 252, the reduction and the expansion section 254 and the sharpness processing section 256, respectively. The image data processed at this image processing section 120A is displayed on a monitor not illustrated herein, or output to the order information setting section 126 (Refer to FIG. 2) and so forth.

At the print order receiving machine 230, a determining section 258 for determining the surface conditions (a state of the surface) of the photographic print 62 on the basis of the measurement results of the gloss detecting sensor 250 is arranged.

The photographic print 62, generally of glossy finish, is characterized by sharp finish, while it is subject to influences of light reflection on luster surface and so forth. The photographic print of silk finish attains a special round rendition feeling, but concaves and convexes of 1 to 100 $\mu$m are formed on its emulsion surface.

Further, the photographic print 62 of mat finish is characterized by modest atmosphere and depth and solid rendition (image formation), and is also referred to as semi gloss finish, wherein finish luster is controlled.

On the other hand, when light beam of spot shape is radiated onto the surface of the photographic print 62, reflected light becomes of spot shape on luster surface, while, reflected light is diffused on convexes and concaves and mat surface conditions.

Namely, if reflected light is near spot diameter, the surface is smooth luster surface, while rougher the surface (bigger the convex and concave), the wider the reflected light becomes, and finally is diffused and spot disappears.

From this point, in the determining section 258, the gloss detecting sensor 250 receives the reflected light of light beam of spot shape radiated on the photographic print 62, and can determine the surface conditions of the photographic print 62 on the basis of light receiving results.

As such a gloss detecting sensor 250, for example, the glossiness determination sensor PI-G (product name) manufactured by Keyence Corporation and so forth may be employed.

At the image processing section 120A, a parameter switching section 260 is arranged. In this parameter switching section 260, parameter for processing to image data at the preprocessing filter 252 and the sharpness processing section 256 is switched according to the determination results of the determining section 258.

Thereby, the image processing section 120A arranged at the print order receiving machine 230 automatically detects the surface conditions of the photographic print 62, and appropriate image processing is enabled according to the surface conditions. In the print order receiving machine 230, the processing conditions at this moment is held by the photographic print 62 as order information.

In the image processing section 120A, a setup section 262 and a color reproduction 3D-LUT 264 are arranged. In this setup section 262, it is determined whether the image formed on the photographic print 62 has discoloration or not under influences of ultraviolet ray and so forth. In the color reproduction 3D-LUT 264, on the basis of this determination results, image processing is made so as to reproduce the color before discoloration.

With respect to such an image processing, for example, color decomposition is carried out according to image data, and determination is made from balance, hue and so forth of respective colors, and reverse correction is carried out on the basis of determination results, thereby colors are reproduced.

Namely, when it is determined from color balance and hue that the image formed on the photographic print 62 is sepia or its hue is sepia, parameters are set so as to get the color balance or hue back, and reverse correction is made, thereby the original color at the image formation (print original) is reproduced. In the case where a white edge is arranged at the circumferential portion of the photographic print 62, the color of this white edge may be read, and it may be determined whether discoloration occurs or not therein, and thereby parameters for discoloration correction may be set.

Figure 23:
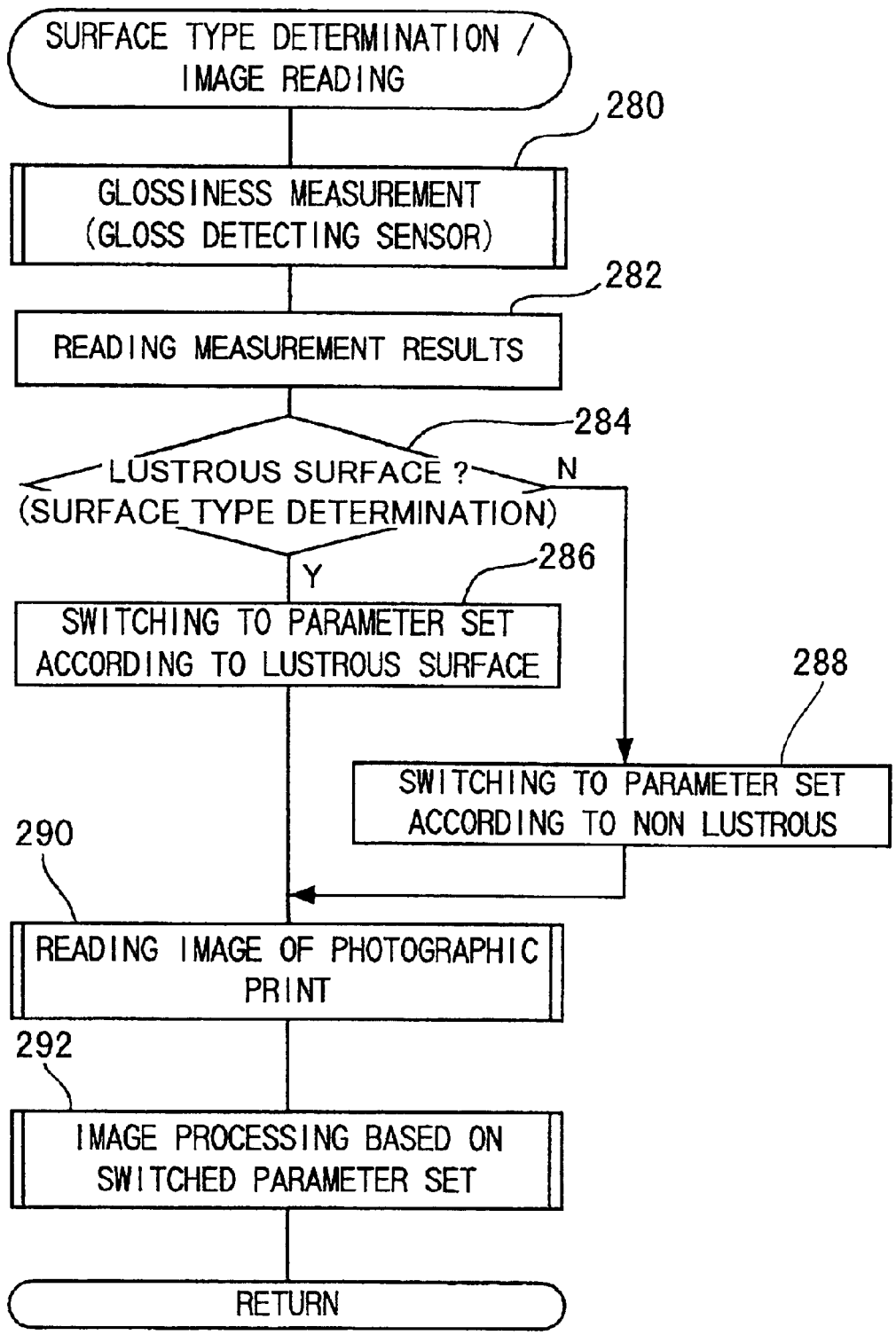
FIG. 23 is a flow chart showing the outline of image reading by a print order receiving machine according to a third embodiment of the present invention.

Herein, as the actions of the third embodiment, in reference to FIG. 23, the outline of the processing based on the determination on surface conditions of the photographic print 62 by the print order receiving machine 230 and the determination results is explained hereafter.

In the print order receiving machine 230, when the photographic print 62 is inserted from the insertion hole, this photographic print 62 is pinched and pulled in by the insertion roller couple 236, and then sent in to the reading stage 234 of the scanner section 232. Thereafter, the photographic print 62 sent in to the scanner section 232 is loaded onto the predetermined position of the reading stage 234, then the vacuum source 238 is activated, and the photographic print 62 is absorbed and held on the reading stage 234.

The photographic print 62 wherein an image is formed on photographic paper of roll shape in general sometimes has curl or so, and may have curl or warp accordingly. Such photographic print 62 is absorbed and held on the reading stage 234, thereby its plane property is kept, therefore, it is possible to prevent mistake in determining surface conditions or deformation in the image of read image data reliably.

The structure for keeping the photographic print 62 plane is not limited to the above, but any optional structure well known such as using a mask or a press plate such as transparent glass plate and so forth may be employed.

In the print order receiving machine 230, when the photographic print 62 is set onto the scanner section 232, and instructions to read image is input or order conditions are input, and reading the image formed on the photographic print 62 starts, the procedures in the flow chart shown in FIG. 23 are carried out.

In this flow chart, in its first step 280, luster of the surface of the photographic print 62 is measured by use of the gloss detecting sensor 250, and this measurement result is read into the determining section 258 (step 282).

In the scanner section 232, it is arrange so that the gloss detecting sensor 250 carries out the luster measurement at the predetermined position of the photographic print 62 on the reading stage 234, however, by carrying out the luster measurement by moving the gloss detecting sensor 250, or by carrying out the luster measurement by arranging plural gloss detecting sensors 250, the luster at plural positions of the surface of the photographic print 62 may be measured. Thereby, it is possible to prevent mistake in determination owing to dust or dirt on the surface of the photographic print 62, which is preferable.

In the next step 284, the luster determination as the determination of the surface conditions of the photographic print 62 is carried out from the read measurement results. In this luster determination, light beam of spot shape is radiated to the photographic print 62, and this reflected light is received, and luster is determined by whether the received light is of spot shape or diffused.

For example, the concave and convex on the surface of the photographic print 62 are 10 $\mu$m or more, and it is determined that the surface of the photographic print 62 is rough, it is determined whether a luster surface or not on the basis of the focusing conditions (spot diameter, light amount, light amount distribution, and so forth) of the reflected light at this roughness.

Herein, if it is determined the reflected light is of spot shape and it is a luster surface, positive determination is made in the step 284, and the process goes on to the step 286. In the step 286, the parameter for processing of image data at the preprocessing filter 252 and the sharpness processing section 256 is switched into the parameter set according to the luster surface.

For instance, the parameter concerning the preprocessing filter 252 is switched into the parameter set so as to remove the high frequency components included in image data. For example, in the photographic print 62 of silk finish or so, fingerprints are hardly attached to the surface, while on luster surface of glossy finish or so, fingerprints are apt to be attached thereon, so the parameter is switched into the parameter set so as to carry out fingerprint removal processing.

With respect to the sharpness processing section 256, the parameter is switched into the parameter set so as to carry out the optimized sharpness processing to the image data read from luster surface.

On the other hand, when it is determined as a non luster surface, negative determination is made in the step 284, and the process goes on to the step 288. In the step 288, the parameter is switched into the parameter set according to non luster surface. Namely, the parameter is switched into the parameter set so as to control the removal of high frequency components, or the parameter set so as to control fingerprint removal processing, and further the parameter is switched into the parameter set so as to carry out the optimized sharpness processing to the image data read from non luster surface.

In these manners, parameter switching is carried out on the basis of the surface type determination of the photographic print 62 and determination results, then the process shifts to the step 290, wherein image is read by use of the CCD line sensor 114, and the read image data is stored into the image memory 118. Further, in the step 292, image processing is carried out on the basis of parameters switched according to surface types, at the preprocessing filter 252, the reduction and expansion section 254 and the sharpness processing section 256 respectively.

Accordingly, in the print order receiving machine 230, surface types of the photographic print 62 are determined, and parameters are switched according to the determination results thereof. At this moment, by switching the parameter into the parameter set so that the optimized image processing is available according to the size of concave and convex on surface of the photographic print 62 (surface roughness), it is possible to generate an appropriate image data irrespective of the surface conditions of the photographic print 62.

In the present embodiment, as an example, the surface of the photographic print 62 is determined in two steps, i.e., whether luster surface or non luster surface, however, the determination is not limited to this, and determination may be made in several steps, i.e., whether the photographic print 62 is luster surface of glossy finish or so, or semi luster surface of mat finish or non luster surface of silk finish or so, and parameters may be switched into parameters set for processing of appropriate image reading and image data according to respective finish types.

On the other hand, in the print order receiving machine 230, when image processing in the preprocessing filter 252 and the sharpness processing section 256 and so forth according to the surface types of the photographic print 62 is completed, the setup section 262 determines whether there is discoloration or the similar or not, and by the color reproduction 3D-LUT 264, if there is discoloration or the similar, reverse correction is carried out according to the discoloration conditions, and thereby image data that can reproduce the image of the original photographic print 62 is generated.

Thereby, even if there is any image change such as discoloration or so in the photographic print 62 that an orderer has brought about, it is possible to create the photographic print 62 wherein the original image is formed.

In the third embodiment, parameters for image processing are switched according to the surface types (surface conditions) of the photographic print 62, however, when reading an image formed on the photographic print 62, the radiation angle of the light to be radiated from the light source 244 to the photographic print 62 may be switched.

Figure 24:
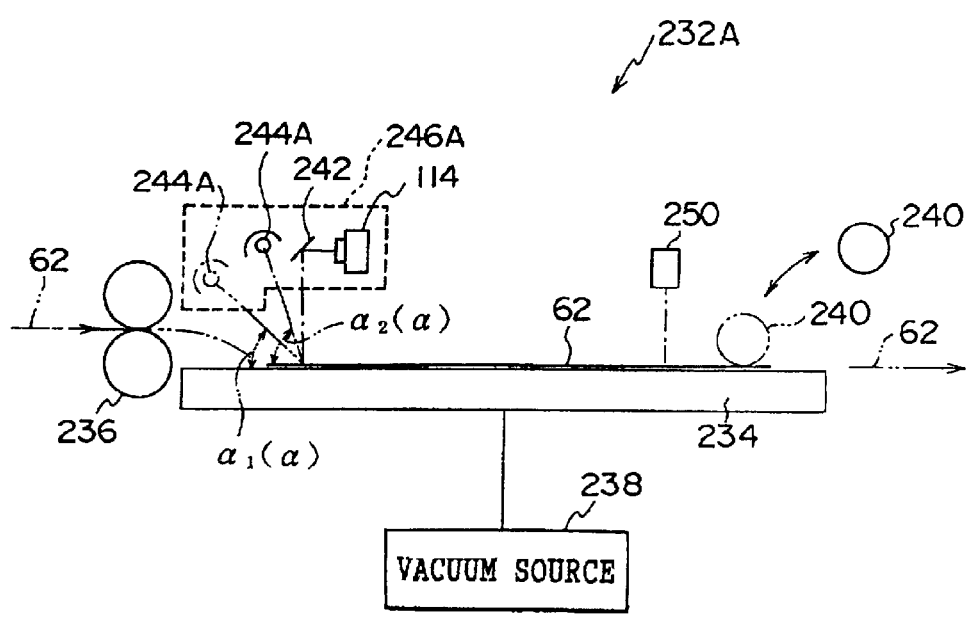
FIG. 24 is a schematic structural view of a main portion of another embodiment of a print order receiving machine according to the present invention

Namely, in the scanner section 232A shown in FIG. 24, the position of the light source 244A arranged on the scanning unit 246A is switched on the basis of the determination results of the determining section 258 (not illustrated in FIG. 24).

In a status wherein there are concaves and convexes on the surface of the photographic print 62, when the radiation angle of the light from the light source 244A to the surface of the photographic print 62 is made small ($\alpha=\alpha_1$) as shown by dot line in FIG. 24, shadows by convexes and concaves of the surface of the photographic print 62 may occur.

In a luster surface with extremely small convexes and concaves on the surface, when the radiation angle $\alpha$ of the light from the light source 244A to the surface of the photographic print 62 is made large ($\alpha=\alpha_2$, $\alpha_2>\alpha_1$), the light receiving amount by the CCD line sensor 114 increases even with an identical image, and in some case, the CCD array may be saturated.

From this point, in the scanner section 232A, when the photographic print 62 is determined as a luster surface, the light source 244A is moved to the position shown by dot line in FIG. 24 so that the incidental angle $\alpha$ should be the incidental angle $\alpha_1$, while, when the surface of the photographic print 62 is determined as a non luster surface, the light source 244A is moved to the position shown by actual line in FIG. 24 so that the incidental angle $\alpha$ should be the incidental angle $\alpha_2$.

In this manner, namely, by switching the position of the light source 244A at the moment of reading image according to the surface types (surface conditions) of the photographic print 62, it is possible to read an image formed on the photographic print 62 in appropriate manners irrespective of the surface conditions of the photographic print 62. Further, by carrying out image processing of read image data on the basis of the parameters switched according to the surface conditions of the photographic print 62, it is possible to obtain a far more appropriate image data.

In the scanner section 232A, the light source 244A is set to move according to the surface conditions of the photographic print 62, however, the present invention is not limited to this, but plural light sources with different incidental angles may be arranged, and a light source may be selected according to the surface conditions of the photographic print 62 and an image may be read thereby.

On the other hand, in the third embodiment, explanations heretofore have been made with the scanner section 232 of a light source move method wherein the light source 244 as image reading means moves to the sub scanning direction, while, a light source may be fixed, and image reading means of light source fixed method wherein the photographic print 62 is moved with respect to the light source may be arranged together or separately, and the image reading means of light source move method and the image reading means of light source fixed method may be switched according to the surface conditions of the photographic print 62.

Namely, if there are concaves and convexes on the surface of the photographic print 62, and image reading means of light source move method is employed, there is a fear that concaves and convexes on the surface of the photographic print 62 may appear as shadows on image data, therefore, image reading means of light source fixed method may be used for non luster surface, and image reading means of light source fixed method or light source move method may be used for luster surface.

In the third embodiment, surface type determining means and parameter switching means based on determination result are arranged to a print order receiving machine, however, a similar structure may be arranged to a print processing device, thereby, it is possible to generate appropriate image data from the photographic print 62 ordered for copies, irrespective of surface types of the photographic print 62, and to form a new photographic print 62.

In the embodiments of the present invention which are described above, the photographic print 62, in which the image is formed on photographic printing paper, is used as the image recording medium on which the image is formed. However, the present invention is not limited to the photographic print 62. By using a variety of image recording media such as paper or the like, the present invention can be applied to the copying of images which are formed on such image recording media.

As described above, in accordance with the present invention, orders for additional printing and the like are received by displaying an image which corresponds to the order conditions. The image, which is formed on the image recording medium, is formed onto the new image recording medium on the basis of the order conditions. Thus, an excellent effect is achieved in that it is possible to copy an image in accordance with the order of a person who places an order.

What is claimed is:

1. A print processing method for carrying out print processing in which an image which corresponds to a visible image recorded on an image recording medium is formed onto a new image recording medium, said method comprising the steps of:

reading and displaying the image which is formed on the image recording medium;

changing the displayed image by carrying out image processing on the basis of processing conditions which are set in accordance with inputted order conditions;

electronically recording order information, which includes the processing conditions and the inputted order conditions onto one of the image recording medium on which the visible image is formed and an order information recording medium; and forming the image which is formed on the image recording medium onto the new image recording medium on the basis of the electronic order information, wherein the order information electronically recorded onto the image recording medium is invisible.

2. The print processing method according to claim 1, wherein the image recording medium on which the image is formed is used as the order information recording medium.

3. A print processing method for carrying out print processing in which an image which corresponds to a visible image recorded on an image recording medium is formed, onto a new image recording medium, said method comprising the step of:

electronically recording inputted order conditions and processing conditions as order information onto the image recording medium on which the visible image is formed, and forming the image which is formed on the image recording medium onto a new image recording medium on the basis of the order information, wherein the order information electronically recorded onto the image recording medium is invisible.

4. The print processing method according to claim 1, wherein copy information including the order information is electronically recorded onto the new image recording medium.

5. The print processing method according to claim 3, wherein copy information including the order information is electronically recorded onto the new image recording medium.

6. The print processing method according to claim 1, wherein the new image recording medium is a photographic printing paper.

7. The print processing method according to claim 3, wherein the new image recording medium is a photographic printing paper.

8. The print processing method according to claim 1, wherein:

the processing conditions include at least one of gray balance adjustment, gradation adjustment, density adjustment, saturation adjustment, sharpness processing, dodging processing, electronic magnification processing, geometric processing, peripheral quantity of light correcting processing, soft focusing processing, and red-eye correcting processing.

9. The print processing method according to claim 3, wherein:

the processing conditions include at least one of gray balance adjustment, gradation adjustment, density adjustment, saturation adjustment, sharpness processing, dodging processing, electronic magnification processing, geometric processing, peripheral quantity of light correcting processing, soft focusing processing, and red-eye correcting processing.

10. The print processing method according to claim 1, wherein the order information electronically recorded onto one of the image recording medium and the order information recording medium is invisible.

11. The print processing method according to claim 1, wherein the order information is electronically recorded onto a semiconductor memory which is borne in one of the image recording medium and the order information recording medium.

12. The print processing method according to claim 1, wherein the order information is made into a bar code and recorded onto one of the image recording medium and the order information recording medium.

13. The print processing method according to claim 12, wherein the order information electronically recorded onto one of the image recording medium and the order information recording medium is invisible.

14. The print processing method according to claim 3, wherein the order information is electronically recorded onto a semiconductor memory which is borne in the image recording medium.

15. The print processing method according to claim 3, wherein the order information is made into a bar code and recorded onto the image recording medium.

16. The print processing method according to claim 15, wherein the order information electronically recorded onto the image recording medium is invisible.

* * * * *